United States Patent
Tsukamoto et al.

(10) Patent No.: US 9,918,245 B2
(45) Date of Patent: Mar. 13, 2018

(54) WIRELESS TERMINAL DEVICE, MEASUREMENT CONTROL METHOD, CONTROL METHOD, MEASUREMENT CONTROL PROGRAM, AND RECORDING MEDIUM

(71) Applicant: Yamaha Corporation, Naka-ku, Hamamatsu-shi, Shizuoka (JP)

(72) Inventors: Takashi Tsukamoto, Hamamatsu (JP); Kenji Ishihara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/383,408

(22) PCT Filed: Feb. 28, 2013

(86) PCT No.: PCT/JP2013/055445
§ 371 (c)(1),
(2) Date: Sep. 5, 2014

(87) PCT Pub. No.: WO2013/133125
PCT Pub. Date: Sep. 12, 2013

(65) Prior Publication Data
US 2015/0043325 A1    Feb. 12, 2015

(30) Foreign Application Priority Data
Mar. 8, 2012 (JP) .................................. 2012-052270

(51) Int. Cl.
*H04W 24/10* (2009.01)
*H04W 84/12* (2009.01)
(Continued)

(52) U.S. Cl.
CPC .......... *H04W 24/10* (2013.01); *H04L 41/0659* (2013.01); *H04L 43/08* (2013.01); *H04W 84/12* (2013.01)

(58) Field of Classification Search
CPC ...................................................... H04L 43/08
See application file for complete search history.

(56) References Cited

U.S. PATENT DOCUMENTS 8,190,153 B2 * 5/2012 Zhao ................. H04W 52/0254
                                                    342/357.21
8,217,843 B2 * 7/2012 Shtrom ................ H01Q 1/2291
                                                    343/702
(Continued)

FOREIGN PATENT DOCUMENTS

CN    102217356 A    10/2011
CN    102301778 A    12/2011
(Continued)

OTHER PUBLICATIONS

Japanese Office Action issued in counterpart Japanese Application No. JP 2012-052270 dated Oct. 27, 2015 (Two (2) pages).
(Continued)

*Primary Examiner* — Hassan Kizou
*Assistant Examiner* — Deepa Belur
(74) *Attorney, Agent, or Firm* — Crowell & Moring LLP

(57) ABSTRACT

A wireless terminal device performs a communication via the wireless LAN and also performs a communication via a wireless communication network different from the wireless LAN. The wireless terminal device is provided with a determiner for determining whether the device is moving or not, and a measurement controller for measuring a communication power of a communication radio wave transmitted from an access point of the wireless LAN in the position of the determination and for transmitting the information for allowing the operation administrator to specify the measured
(Continued)

value of the communication power and the measurement position to the predetermined destination via the above described wireless communication network, triggered by a fact that the determiner determines that the wireless terminal device is not moving.

27 Claims, 10 Drawing Sheets

(51) Int. Cl.
*H04L 12/24* (2006.01)
*H04L 12/26* (2006.01)

(56) References Cited

U.S. PATENT DOCUMENTS

| | | | | |
|---|---|---|---|---|
| 2004/0043797 | A1* | 3/2004 | Shostak | H04W 52/0216 455/574 |
| 2005/0063340 | A1* | 3/2005 | Hoffmann | H04W 16/28 370/332 |
| 2005/0239510 | A1* | 10/2005 | Cho | H04B 7/022 455/562.1 |
| 2007/0263575 | A1* | 11/2007 | Choe | H04W 36/0066 370/338 |
| 2008/0002616 | A1* | 1/2008 | Stahl | H04W 76/023 370/329 |
| 2008/0014934 | A1 | 1/2008 | Balasubramanian et al. | |
| 2009/0257353 | A1* | 10/2009 | Song | H04W 24/02 370/241 |
| 2010/0197239 | A1 | 8/2010 | Catovic et al. | |
| 2011/0263244 | A1* | 10/2011 | Kobayashi | H04W 24/08 455/423 |
| 2012/0157113 | A1* | 6/2012 | Brisebois | G01S 5/00 455/456.1 |
| 2013/0235861 | A1 | 9/2013 | Balasubramanian et al. | |
| 2013/0272255 | A1* | 10/2013 | Zhu | H04B 7/0486 370/329 |
| 2014/0135032 | A1* | 5/2014 | Kim | H04W 72/082 455/454 |
| 2014/0155072 | A1* | 6/2014 | Hellmann | H04W 36/32 455/440 |
| 2014/0274066 | A1* | 9/2014 | Fodor | H04W 36/08 455/437 |
| 2015/0350976 | A1* | 12/2015 | Kodali | H04W 36/0088 455/440 |
| 2015/0365872 | A1* | 12/2015 | Dudda | H04W 36/0055 455/436 |

FOREIGN PATENT DOCUMENTS

| | | |
|---|---|---|
| JP | 2005-337990 A | 12/2005 |
| JP | 2008-182507 A | 8/2008 |
| JP | 2008-306240 | 12/2008 |
| JP | 2009-44309 A | 2/2009 |
| JP | 2009-544245 A | 12/2009 |
| JP | 2010-93520 A | 4/2010 |
| JP | 2010-130171 A | 6/2010 |
| JP | 4654507 B2 | 1/2011 |
| JP | 2011-130059 A | 6/2011 |
| JP | 2012-44597 A | 3/2012 |
| WO | WO 2010/055721 A1 | 5/2010 |
| WO | WO 2013/133125 A1 | 9/2013 |

OTHER PUBLICATIONS

International Search Report (PCT/ISA/210) dated Apr. 23, 2013, with English translation (Five (5) pages).
Japanese language Written Opinion (PCT/ISA/237) dated Apr. 23, 2013 (Four (4) pages).
Japanese Office Action in corresponding Japanese Application No. 2012-052270 dated May 11, 2016 (6 pages) with English translations.
Chinese-language Office Action issued in counterpart Chinese Application No. 201380013253.6 dated May 11, 2017 with English translation (20 pages).
Japanese-language Office Action issued in counterpart Japanese Application No. 2012-052270 dated Dec. 27, 2016 with English translation (6 pages).
Chinese-language Office Action issued in counterpart Chinese Application No. 201380013253.6 dated Dec. 11, 2017 with English translation (16 pages).

* cited by examiner

WIRELESS TERMINAL DEVICE, MEASUREMENT CONTROL METHOD, CONTROL METHOD, MEASUREMENT CONTROL PROGRAM, AND RECORDING MEDIUM

TECHNICAL FIELD

The present invention relates to a technology for evaluating an accessibility of a wireless local area network (LAN).

BACKGROUND ART

A strength of a communication radio wave (hereinafter, sometimes referred to as an amount of electric field strength or a communication power) transmitted from each access point included in the wireless LAN can be included as an example of an index for evaluating a quality of the communication state of a wireless LAN such as an accessibility of a wireless LAN (that is, whether communication via the wireless LAN is possible or not, or to what extent excellent communication can be performed). For example, in Patent Literature 1, a technology is disclosed, in which a monitoring beacon is periodically transmitted to an access point, each wireless slave station (wireless terminal device) accommodated in the access point is caused to stop communication and to perform a measurement of the ambient electric field strength, triggered by receiving the monitoring beacon, and by notifying the access point of the measurement result, the presence or absence of interference in the vicinity of the access point due to a radio wave transmitted from another adjacent access point is investigated. In addition, a technology disclosed in Patent Literature 2 is a technology for measuring the electric field strength when the electric field strength in a mobile information terminal is equal to or lower than a threshold value.

CITATION LIST

Patent Literature

Patent Literature 1: Japanese Patent No. 4654507
Patent Literature 2: JP-A-2010-093520

SUMMARY OF INVENTION

Technical Problem

In the technology disclosed in Patent Literature 1, there is an advantage in which a communication power at the position where a frequency of using a wireless LAN is high such as in the vicinity of access points can be measured without causing a user of a wireless slave station to perform a specific operation, while there is a disadvantage in which, during the measurement of the communication power, the communication between each wireless slave station and the access point is stopped all at once. In addition, there is a problem in that the measurement of the communication power cannot be performed at all in a case where the wireless slave station cannot correctly receive the monitoring beacon due to a communication failure or the like, and there is a problem in that there cannot be a reply with the measurement result in a case where the wireless slave station can receive the monitoring beacon but the degree of communication failure is getting worse. Particularly, in a case where there cannot be a reply with the measurement result, there occurs a problem in that it is difficult for an operation administrator of the wireless LAN to quickly ascertain the measurement result, and thus, a counteraction for the communication failure may be delayed.

In the technology disclosed in Patent Literature 2, for example, in a case where the electric field strength does not become equal to or lower than a threshold value due to radio wave interference from other access points, since the measurement of the electric field strength is not performed, there is a problem in that the technology is not suitable for a site survey for finding a position where the electric field strength is equal to or lower than the threshold value, at all. In addition, in the technology disclosed in Patent Literature 2, there is also a problem in that it is difficult to detect that the radio wave interference is received from other access points.

The present invention is made in consideration of the above circumstance and an object thereof is to provide a technology for measuring a quality of the communication state at the position where the possibility of a user using a wireless LAN is high without causing a user to perform a specific operation, and allowing the measurement result to be ascertained by the operation administrator of the wireless LAN without delay.

Solution to Problem

A first aspect of the present invention provides a wireless terminal device including: a wireless communicator, configured to perform a measurement of an index indicating a quality of a communication state in a first wireless communication network and transmission and reception of data via the first wireless communication network; a determiner, configured to determine whether the wireless terminal device is moving or not; and a measurement controller, configured to control the wireless communicator to measure the index indicating the quality of the communication state of the first wireless communication network, and to control the wireless communicator to transmit information capable of specifying a measurement position or information indicating the measurement position and the measured index to a predetermined destination, triggered by a fact that the determiner determines that the wireless terminal device is not moving. Here, a magnitude (electric field strength) of a communication power of a communication radio wave transmitted from an access point in a wireless communication network, an occurrence rate (hereinafter, referred to as a CRC error rate) of CRC (cyclic redundancy check) errors for frames (e.g., beacon frames) transmitted from the access point, or a frame retransmission rate for the frames transmitted from the access point are given as specific examples of the index indicating the quality of the communication state. However, it is not limited to those examples. A method of calculating the CRC error rate and a method of calculating the frame retransmission rate are explained in embodiments of the present invention in order to avoid repetitive explanation.

For example, in a case where the communication power is used as an index indicating the quality of the communication state, according to the wireless terminal device in the first aspect of the present invention, triggered by the fact that the own device is determined not to be moving, the communication power in the position of a wireless terminal device at that time is measured, and the information indicating the value of the measured communication power and the information that can specify the measurement position or the information indicating the measurement position are transmitted to a predetermined destination. Generally, the wireless terminal device is carried by the user with the power turned ON, and the fact that the wireless terminal device is not moving means that the user who carries the wireless terminal device remains at one place. Therefore, according to the wireless terminal device in the first aspect of the present invention, in a case where the user who carries the wireless terminal device with the power ON remains at one place, the measurement of the communication power of the communication radio wave transmitted from the access point in the wireless communication network at that place is performed.

Here, if it is assumed that the wireless communication network is a wireless LAN installed in a workplace of the user, a case where the user remains at one place in the workplace is considered to be that the user is in the state of working at his/her desk or attending a meeting in a conference room. Since a desk or a conference room is a place where the frequency of the user using the wireless LAN is high, according to the first aspect of the present invention, it is possible to efficiently measure the communication power at the place where the frequency of the user of the wireless terminal device using the wireless LAN is high, and to transmit the communication power to the predetermined destination without delay.

For example, in a case where the above-described wireless communicator also performs data communication via a second wireless communication network (in the above example, a mobile telephone network) different from the wireless communication network of which the index indicating the quality of the communication state is subject to be measured such as the case where the above described wireless terminal device is a mobile phone having a wireless LAN access function such as a smart phone and the wireless LAN is the wireless communication network of which the index indicating the quality of the communication state is subject to be measured, the information that can specify the measurement position or the information indicating the measured position and the measured index may be transmitted to the predetermined destination via the second wireless communication network. According to this aspect, even if there is a case where the data communication via the wireless communication network of which the index indicating the quality of the communication state is subject to be measured is not performed due to a certain communication failure (for example, interference due to a radio wave transmitted from other access points), it is possible to transmit the index or the like to the predetermined destination without delay. In addition, in the present invention, since the measurement of the communication power and the transmission of the measurement result to the predetermined destination are performed triggered by the fact that the wireless terminal device is not moving, the user of the wireless terminal device does not need to perform any operation for the above-described executions.

In addition, in a case where the CRC error rate is used as the index indicating the quality of the communication state, it is possible to ascertain the presence or absence of the interference due to the communication radio wave transmitted from a wireless communication device other than the original access point subject to be measured in the measurement position (another access point or a wireless terminal device other than the wireless terminal device performing the measurement). That is because, in many cases generally, a CRC error occurs in a case where a frame is destroyed due to the interference caused by a communication radio wave transmitted from other access points. In a case where the frame retransmission rate is used as the index indicating the quality of the communication state, it is possible to ascertain the communication state at the position of another wireless terminal device (a wireless terminal device used by another person who is in the neighborhood of the user of the above wireless terminal device) that performs communication with the access point in the vicinity of the wireless terminal device in the present invention. That is, in a case where the communication power or the CRC error rate is used as the index indicating the quality of the communication state, it is possible to ascertain the communication state of the wireless communication network at a point where the user of the wireless terminal device in the present invention stops moving, and in a case where the frame retransmission rate is used as the index, it is possible to ascertain the communication state at the position in the vicinity of a point where the above described user stops moving. As described above, the communication power and the CRC error rate are indices indicating the quality of the communication state viewed from different viewpoints (a viewpoint on whether the radio wave reaches with a sufficient strength or not and a viewpoint on whether interference from another access point is received or not) from each other at one point where the frequency of the user of the wireless terminal device using the wireless LAN is expected to be high, and the frame retransmission rate is an index indicating the quality of the communication state at the point in the vicinity of (the position of the other wireless terminal device performing communication with the access point) the place where the frequency of the user of the wireless terminal device using the wireless LAN is expected to be high. Of course, only one index among these three indices may be used for the evaluation of the quality of the communication state. However, the aspect of using any two indices among these three indices enables the evaluation of the quality of the communication state of the wireless LAN to be accurate and multifaceted. According to the aspect of using all the three indices, it is possible to evaluate the quality of the communication state of the wireless LAN with high accuracy and in a multifaceted manner.

In the above-described wireless terminal device, a timer may be provided in the wireless terminal device, and triggered by the fact that the determiner determines that the wireless terminal device is not moving, the timer may start to measure the time, and the index indicating the quality of the communication state may be measured for every certain time interval while the wireless terminal device is determined not to be moving. According to this aspect, in the place where the frequency of using the wireless LAN is considered to be high, it is possible to ascertain the communication state which is changing every moment.

In addition, a position specifier for specifying the position of the wireless terminal device may be provided on the wireless terminal device, and in the measurement controller, the measurement of the communication state may be performed under a condition that the position specified by the position specifier is a position within a region designated in advance. According to this aspect, by designating all places (or a specific area such as a conference room or the user's desk) in a workplace of the user of the wireless terminal device in advance as the region for measuring the communication state, it is possible to avoid unnecessary measurement of the communication state in other places (for example, user's home or the like).

Furthermore, a measurement result determiner for determining an abnormality of the measurement result may be provided on the wireless terminal device, and in a case where the measurement result of the communication state is determined to be abnormal by the measurement result determiner, a measurement controller may perform the processing of transmitting management information to cope with the abnormality and the measurement result of the communication state to the predetermined destination. For example, if a mail address of the operation administrator of the wireless communication network is set as the predetermined destination, it is possible for the operation administrator to quickly cope with the abnormality with reference to the measurement result of the communication state and the management information transmitted from the wireless terminal device.

In addition, in response to the transmission of the measurement result from the wireless terminal device, a server apparatus that sends back a program for isolating a failure may be connected to the wireless communication network (or the second wireless communication network), the communication address of the server apparatus may be designated as the predetermined destination and the wireless terminal device may execute the program sent back from the server apparatus. According to this aspect, it is possible to automate the identifying or isolating of the abnormality or the failure occurring at the time of measuring the communication state.

In addition, it may be configured by further including: an acceleration sensor that detects an acceleration generated according to external force applied to the wireless terminal device, wherein the determiner determines that the wireless terminal device is not moving in a case where time in which the magnitude of the acceleration comes within a predetermined range of which the center is the magnitude of the gravitational acceleration continues over the predetermined time period.

A second aspect of the present invention provides a measurement control method in a wireless terminal device, the measurement control method including: determining whether the wireless terminal device is moving or not; and measuring an index indicating a quality of a communication state of the first wireless communication network, and transmitting information capable of specifying a measurement position or information indicating the measurement position and the measured index to a predetermined destination, triggered by a fact that it is determined that that the wireless terminal device is not moving.

A third aspect of the present invention provides a method of controlling a processing unit of a wireless terminal device, wherein the processing unit is controlled to operate as: a wireless communicator, configured to perform a measurement of an index indicating a quality of a communication state in a first wireless communication network and transmission and reception of data via the first wireless communication network; a determiner, configured to determine whether the wireless terminal device is moving or not; and a measurement controller, configured to control the wireless communicator to measure the index indicating the quality of the communication state of the first wireless communication network, and to control the wireless communicator to transmit information capable of specifying a measurement position or information indicating the measurement position and the measured index to a predetermined destination, triggered by a fact that the determiner determines that the wireless terminal device is not moving.

A fourth aspect of the present invention provides a measurement control program causing a processing unit of a wireless terminal device to operate as: a wireless communicator, configured to perform a measurement of an index indicating a quality of a communication state in a first wireless communication network and transmission and reception of data via the first wireless communication network; a determiner, configured to determine whether the wireless terminal device is moving or not; and a measurement controller, configured to control the wireless communicator to measure the index indicating the quality of the communication state of the first wireless communication network, and to control the wireless communicator to transmit information capable of specifying a measurement position or information indicating the measurement position and the measured index to a predetermined destination, triggered by a fact that the determiner determines that the wireless terminal device is not moving.

A fifth aspect of the present invention provides a non-transitory recording medium for storing the measurement control program.

DESCRIPTION OF EMBODIMENTS

Schematic Configuration

Figure 10:
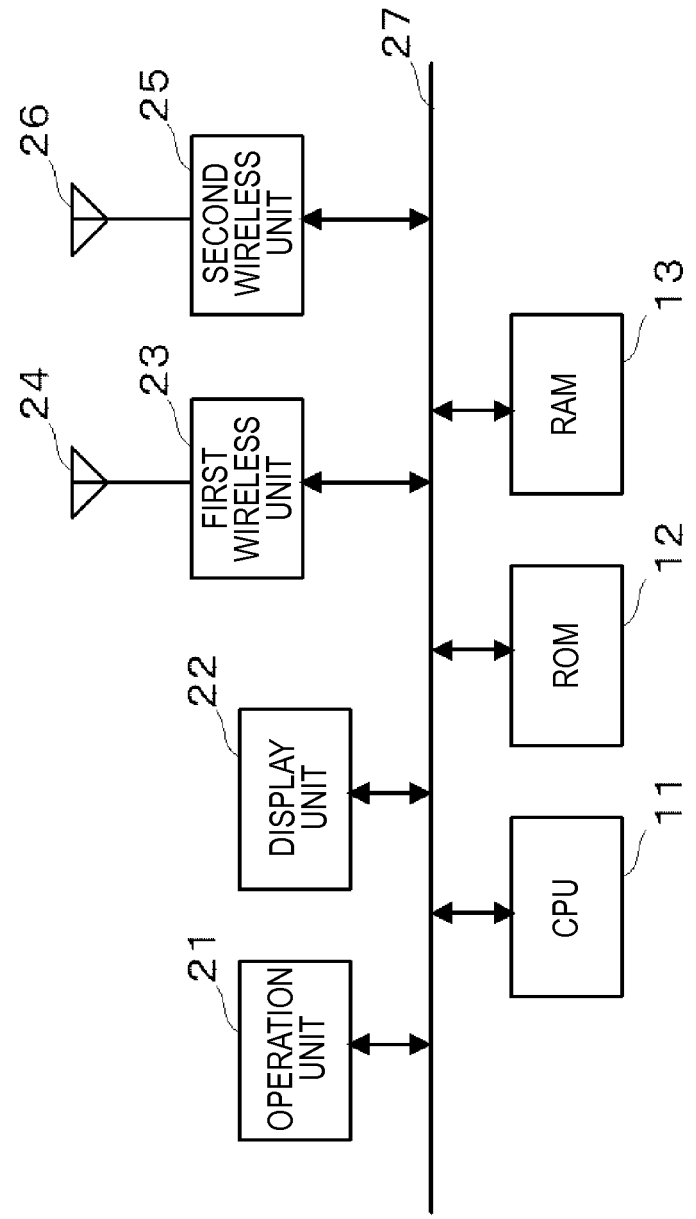
FIG. 10 is a block diagram illustrating a schematic configuration of the wireless terminal device in each embodiment of the present invention.

FIG. 10 is a block diagram illustrating a schematic configuration of a wireless terminal device in each embodiment of the present invention.

The wireless terminal device includes a processing unit having a central processing unit (CPU) 11, a read only memory (ROM) 12, and a random access memory (RAM)

13, an operation unit 21, a display unit 22, a first wireless unit 23, a second wireless unit 25, and antennas 24 and 26 on a bus 27.

In the RAM 13, a work area used when the CPU 11 executes a measurement control program is set. In the ROM 12, a basic program for executing an application program in the wireless terminal device is stored. The ROM 12 is, for example, a flash memory, and a downloaded application program or the like can also be stored therein in addition to the basic program.

The operation unit 21 includes a touch panel formed on the display unit 22, and detects a touching operation or a click operation on the touch panel. The operation unit 21, is not limited to the touch panel, and may include a physical keyboard, buttons or the like. According to the measurement control program executed by the CPU 11, communication with another wireless device is performed via the first wireless unit 23 and the antenna 24, or the second wireless unit 25 and the antenna 26.

Figure 11:
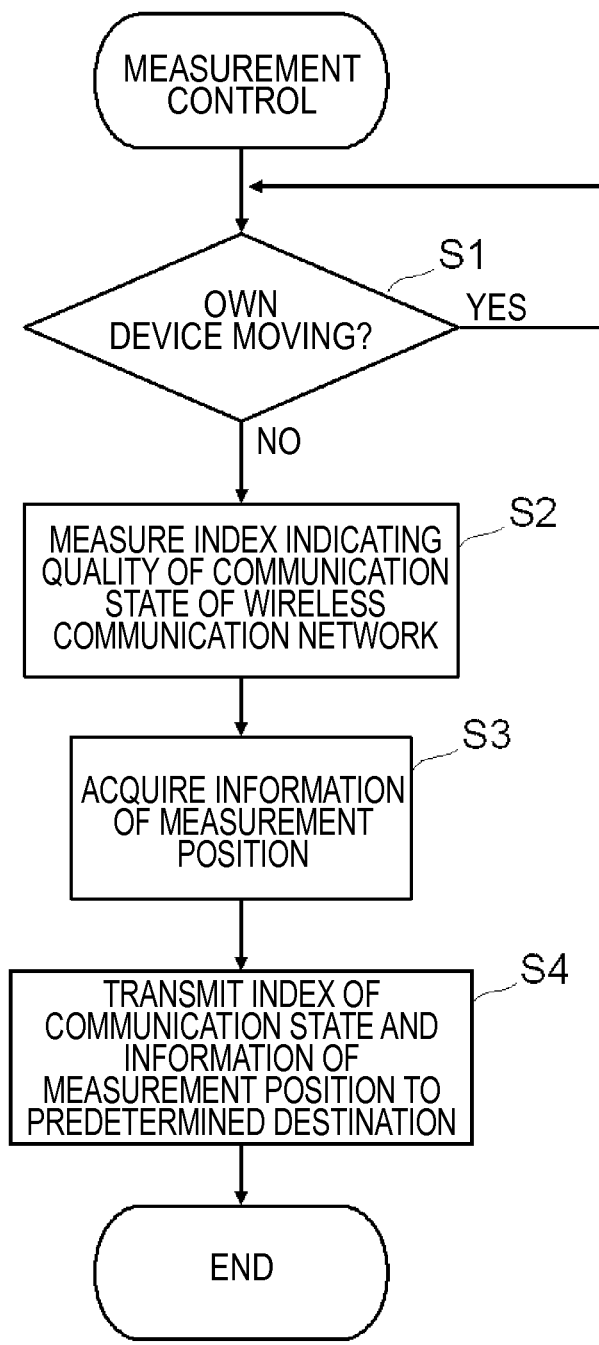
FIG. 11 is a flow chart illustrating an example of a measurement control executed in the wireless terminal device in each embodiment of the present invention.

FIG. 11 is a flow chart illustrating an example of the measurement control executed in the wireless terminal device in each embodiment of the present invention.

In STEP S1, the CPU 21 determines whether the own device is moving or not. In a case where the own device is determined to be moving, the process returns to the determination in STEP S1 again within a predetermined time interval. In a case where the own device is determined not to be moving, an index indicating a quality of communication state of the wireless communication network (for example, a communication network for the communication performed via the first wireless unit 23 and the antenna 24) is measured (STEP S2). Furthermore, information related to the measurement position of the own device is acquired (STEP S3). Then, the index indicating the quality of the communication state and the information of the measurement position acquired in STEPs S2 and S3 respectively are transmitted to a predetermined destination via the wireless communication network (for example, a communication network for the communication performed via the second wireless unit 25 and the antenna 26) (STEP S4).

Each configuration unit or configuration means of the wireless terminal device described in each embodiment below is realized as a functional module of the processing unit which mainly includes the CPU 21. However, it may be realized by providing another processing unit (not limited to whether hardware or software) other than the CPU 21, or by providing dedicated hardware.

Hereinafter, embodiments of the present invention will be described with reference to the drawings.

A: First Embodiment

Figure 1:
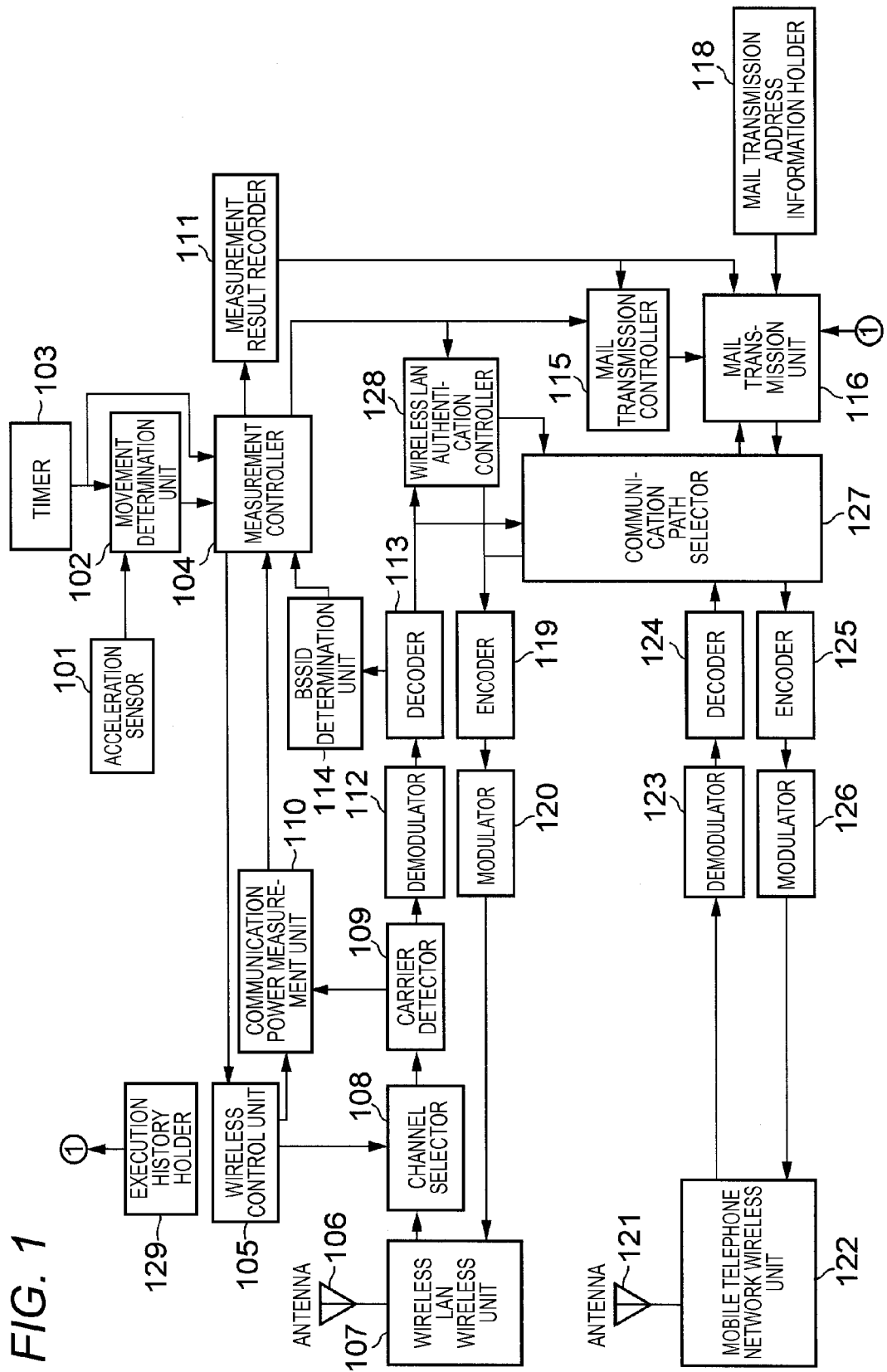
FIG. 1 is a block diagram illustrating a configuration of a wireless terminal device in a first embodiment of the present invention.

FIG. 1 is a diagram illustrating a configuration of the wireless terminal device in the first embodiment of the present invention. The wireless terminal device, for example, is a smart phone, and is configured so as to be able to use two communication paths separately, that is, a wireless LAN which is a first communication network and a mobile telephone network (more accurately, a mobile packet communication network included in the mobile telephone network) which is a second communication network.

The communication via the wireless LAN is realized by an antenna 106, a wireless LAN wireless unit 107, a channel selector 108, a carrier detector 109, a demodulator 112, a decoder 113, a wireless LAN authentication controller 128, an encoder 119, and a modulator 120.

In the wireless LAN, transmission and reception of a data is performed in a unit of a data block called a media access control (MAC) frame. In a case where the MAC frame is transmitted to the access point of the wireless LAN from the wireless terminal device in FIG. 1, from the communication path selector 127, the encoder 119 receives a digital bit stream indicating a MAC frame to be transmitted, performs an encoding to the MAC frame according to the standard of the wireless LAN, and transfers the encoded MAC frame to the modulator 120. The modulator 120 performs a modulation (for example, an orthogonal frequency division multiplexing (OFDM) modulation, or the like) on the digital bit stream transferred from the encoder 119 according to the wireless LAN standard, and transfers the circuit signal obtained by such a modulation to the wireless LAN wireless unit 107. The wireless LAN wireless unit 107 converts the output signal of the modulator 120 to a communication power and transfers the communication power to the antenna 106, and the antenna 106 radiates the communication power to the airspace. In this way, the transmission of the MAC frame from the wireless terminal device to the access point is realized.

On the other hand, reception of the MAC frame transmitted from the access point is realized in the following manner. The antenna 106 transfers the communication power received from the access point of the wireless LAN to the wireless LAN wireless unit 107 and the wireless LAN wireless unit 107 converts the communication power to the circuit signal, and outputs the circuit signal to the channel selector 108. The channel selector 108 extracts a carrier signal and a sub-carrier signal of a specific channel from the output signal of the wireless LAN wireless unit 107, and outputs the carrier signal and the sub-carrier signal to the carrier detector 109. The carrier detector 109 determines whether the communication power of each of the carrier signal and the sub-carrier signal output from the channel selector 108 exceeds a certain threshold value or not, and outputs only the signal having the communication power exceeding the threshold value to the demodulator 112. The demodulator 112 demodulates the digital bit stream from the signal output from the carrier detector 109, and transfers the digital bit stream to the decoder 113.

The decoder 113 performs the decoding on the digital bit stream, and restores the digital bit stream before encoding (that is, the MAC frame transmitted from the access point of the wireless LAN). In addition, the decoder 113 performs the determination of the presence or absence of a CRC error in the restored MAC frame and the determination whether the restored MAC frame is a retransmission frame or not, and calculates a CRC error rate and a frame retransmission rate to write into the storage unit (not illustrated). Here, CRC error means that a checksum calculated from the restored MAC frame and a checksum written into the header portion of the MAC frame do not match each other, and the CRC error rate means the number of MAC frames in which the CRC error occurs with respect to the number of restored MAC frames. In addition, the frame retransmission rate means the number of MAC frames retransmitted by the retransmission processing with respect to the number of restored MAC frames, and the determination of whether or not the restored MAC frame is the retransmitted MAC frame of the retransmission processing can be performed with reference to the header portion of the MAC frame. The decoder 113, when calculating the frame retransmission rate, performs the calculation for each transmission destination MAC address, and when writing the frame retransmission rate into the storage unit, performs the writing for each transmission destination MAC address (that is, in association with the transmission destination MAC address).

Generally, the MAC frame transmitted from the access point of the wireless LAN is roughly divided into a control frame related to an authentication procedure for participating in the wireless LAN and a data frame related to the data transmission. In a case where the control frame addressed to the own device (that is, the transmission destination MAC address is the same as the MAC address of the own device) is obtained by the decoding, the decoder 113 transfers the control frame to the wireless LAN authentication controller 128, and in a case where the data frame addressed to the own device is obtained, transfers the data frame to a communication path selector 127. In addition, when the transmission destination MAC address of the restored MAC frame is not the same as that of the own device, the decoder 113 discards the frame without transferring the frame to each of the next units because the frame is not the frame transmitted to the own device.

The wireless LAN authentication controller 128 performs an authentication procedure for participating in the basic service set (BSS) of the wireless LAN or a processing for leaving the BSS in which the wireless LAN participates. The communication path selector 127 performs a transfer control in accordance with the transmission destination MAC address triggered by receiving the MAC frame from the decoder 113, a decoder 124 described below, or the control unit of the wireless terminal device. Then, in an execution history holder 129, control content data (particularly, control content data in a data link layer) that indicates the control events executed for the wireless communication with the access point of the wireless LAN by each of the above units, is held.

On the other hand, the data communication via the mobile telephone network is realized by an antenna 121, a mobile telephone network wireless unit 122, a demodulator 123, a decoder 124, an encoder 125, and a modulator 126.

In a case where data is transmitted to a base station in a mobile telephone network, a digital bit stream representing the data to be transmitted is transferred to the encoder 125 via the communication path selector 127. The encoder 125 performs the encoding suitable for the mobile telephone network on the digital bit stream transferred from the communication path selector 127, and transfers the encoded digital bit stream to the modulator 126. The modulator 126 performs modulation on a carrier signal of the mobile telephone network using the digital bit stream transferred from the encoder 125 and generates a circuit signal, and then, transfers the carrier signal to the mobile telephone network wireless unit 122. The mobile telephone network wireless unit 122 converts the circuit signal into a communication power and transfers the communication power to the antenna 121. The antenna 121 radiates the communication power to the airspace. In this way, the data transmission from the wireless terminal device to the base station is realized.

In addition, when the communication power transmitted from the antenna of the base station in the mobile telephone network is received, the antenna 121 transfers the communication power to the mobile telephone network wireless unit 122. The mobile telephone network wireless unit 122 converts the communication power transferred from the antenna 121 into the circuit signal and transfers the circuit signal to the demodulator 123. The demodulator 123 demodulates the input circuit signal and takes out the digital bit stream before the modulation, and then, transfers the digital bit stream to the decoder 124. The decoder 124 decodes the digital bit stream transferred from the demodulator 123 to get the digital bit stream that represents the digital bit stream before the encoding. In this way, reception of the data transmitted from the base station can be realized.

The wireless terminal device in the present embodiment, in addition to the function of performing the data communication via the wireless LAN and the function of data communication via the mobile telephone network, has a communication power measurement function of measuring the communication power transmitted from the access point of the wireless LAN. In the present embodiment, a site survey (that is, the measurement of a quality of the communication state in the wireless LAN) for the wireless LAN installed at the workplace of the user of the wireless terminal device is realized using the communication power measurement function. More specifically, the wireless terminal device in the present embodiment includes the following as a configuration for realizing the above-described site survey: an acceleration sensor 101, a movement determination unit 102, a timer 103, a measurement controller 104, a wireless control unit 105, a communication power measurement unit 110, a BSSID determination unit 114, a measurement result recorder 111, a mail transmission controller 115, a mail transmission unit 116, and a mail transmission address information holder 118.

The wireless control unit 105 and the communication power measurement unit 110 realize the function of measuring the communication power of the wireless LAN together with the antenna 106, the wireless LAN wireless unit 107, the channel selector 108, the carrier detector 109, the demodulator 112, the decoder 113, the wireless LAN authentication controller 128, the encoder 119, and the modulator 120. In other words, in the present embodiment, the antenna 106, the wireless LAN wireless unit 107, the channel selector 108, the carrier detector 109, the demodulator 112, the decoder 113, the wireless LAN authentication controller 128, the encoder 119, and the modulator 120, the antenna 121, the mobile telephone network wireless unit 122, the demodulator 123, the decoder 124, the encoder 125, the modulator 126, the wireless control unit 105, and the communication power measurement unit 110 serve as a wireless communicator that realizes the communication power measurement function for measuring the communication power of the wireless LAN, the function of performing the transmission and reception of the data via the wireless LAN, and the function of performing the transmission and reception of the data via the mobile telephone network.

The acceleration sensor 101, the movement determination unit 102, and the timer 103 serve as a determiner that determines whether or not the wireless terminal device is moving. In addition, triggered by the fact that the wireless terminal device is determined not to be moving by the determiner, the timer 103, the measurement controller 104, the wireless control unit 105, the communication power measurement unit 110, the BSSID determination unit 114, the measurement result recorder 111, the mail transmission controller 115, the mail transmission unit 116, and the mail transmission address information holder 118 serve as a measurement controller for causing the wireless communicator to periodically measure the communication power at the location of the wireless terminal device at that time point, and causing the wireless communicator to transmit the value of the measured communication power and the information for specifying the measuring position to a predetermined destination. Hereinafter, each of the configuration components that configure the determiner and the determination controller will be described.

The acceleration sensor 101, for example, is a 3-axis acceleration sensor, periodically detects the acceleration generated according to the external force applied to the wireless terminal device, and outputs the acceleration data that indicates the magnitude of the acceleration to the movement determination unit 102. The movement determination unit 102 determines whether or not the wireless terminal device is moving based on the acceleration data transferred from the acceleration sensor 101, and transfers the determination result signal that indicates the determination result to the measurement controller 104. For example, in a case where the wireless terminal device is determined not to be moving, the movement determination unit 102 transfers the determination result signal having a signal value "1" to the measurement controller 104, and in the other cases, transfers the determination result signal having a signal value "0" to the measurement controller 104. More specifically, triggered by receiving acceleration data that represents an acceleration having a magnitude which comes within the predetermined range of which the center is the magnitude of the gravitational acceleration from the acceleration sensor 101, the movement determination unit 102 causes the timer 103 to start to measure the time, and in a case where the above state (that is, the state in which the magnitude of acceleration detected by the acceleration sensor 101 comes within the predetermined range of which the center is the magnitude of the gravitational acceleration) continues over a predetermined time period (for example, 30 minutes), the movement determination unit 102 determines that the wireless terminal device is not moving. As will be described in detail below, triggered by receiving the determination result signal of which the signal value is "1" from the movement determination unit 102, the measurement controller 104 executes the control for measuring the communication power.

In the present embodiment, in a case where the state in which the magnitude of acceleration detected by the acceleration sensor 101 comes within the predetermined range of which the center is the magnitude of the gravitational acceleration continues over the predetermined time period, the wireless terminal device is determined not to be moving, and the reason for performing the measurement of the communication power is as follows. The wireless terminal device in the present embodiment is a smart phone, and in many cases, is carried in a state that the power is ON. When the user carrying the wireless terminal device performs a movement such as a walking, an external force corresponding to the movement is applied to the wireless terminal device, and the acceleration generated according to the external force is detected by the acceleration sensor 101. On the other hand, in a case where the user carrying the wireless terminal device remains at one place such as working at a desk, attending a meeting in a conference room, or taking a break in the break floor, the magnitude of the acceleration represented by the above acceleration data is equal to the magnitude of the gravitational acceleration or a value close thereto. Therefore, in the present embodiment, in a case where the user carrying the wireless terminal device remains at one place for a predetermined time, the measurement of the communication power is performed. As described above, in a case where the user remains at a certain place such as a workplace without moving, it can be considered that the user is in the state of working at a desk or attending a meeting in a conference room. Here, it can be said that the desk or the conference room where the user is working is the place where the possibility that the user of the wireless terminal device uses the wireless LAN is high. That is, in the present embodiment, in order to make it possible to efficiently measure the communication power at the place where the possibility of the user using the wireless LAN installed at the workplace is high, the measurement of the communication power is performed triggered by the fact that the state in which the magnitude of acceleration detected by the acceleration sensor 101 comes within the predetermined range of which the center is the magnitude of the gravitational acceleration continues over a predetermined time period.

In the present embodiment, not only the state in which the magnitude of the acceleration represented by the above acceleration data is equal to the magnitude of the gravitational acceleration continues over a predetermined time period but also the case of being a value close thereto is included. The reason for this is, in a case where the user performs a minute movement such as stretching the hand to reach documents, to avoid the erroneous determination that the user (the wireless terminal device carried by the user) is moving due to the minute acceleration caused by such a movement. In order to avoid such an erroneous determination, the moving average of the detection value periodically detected by the acceleration sensor 101 may be used rather than using the detection value detected by the acceleration sensor 101 as it is.

The measurement controller 104 is, for example, a CPU, and performs an operation control of other configuration components that configure the measurement controller according to a measurement control program stored in the storage unit (not illustrated) of the wireless terminal device in advance. More specifically, the measurement controller 104, triggered by receiving the determination result signal having a signal value of "1" from the movement determination unit 102, inquires of the wireless LAN authentication controller 128 whether or not the wireless terminal device participates in the BSS of the wireless LAN, and in a case where the wireless terminal device participates in the BSS, instructs the wireless LAN authentication controller 128 to temporarily leave the BSS. Subsequently, the measurement controller 104 instructs the wireless control unit 105 to measure the communication power of all the wireless channels and notifies the movement determination unit 102 of the starting of the measurement of the communication power. The movement determination unit 102 which receives the notification instructs the timer 103 to reset the time (time measured for movement detection) measured up to that time, and the timer 103 resets the time measured up to that time in response to the reset instruction.

The wireless control unit 105, triggered by receiving the instruction to measure the communication power of the all the wireless channels, performs the operation control of the channel selector 108 and the communication power measurement unit 110. The channel selector 108, under the control by the wireless control unit 105, repeats performing the processing of selecting one wireless channel among all the wireless channels and continuing the state for a predetermined time period until all the wireless channels are selected. The communication power measurement unit 110 measures the communication power in the wireless channel for each wireless channel selected by the channel selector 108. More specifically, when the wireless channel is selected by the channel selector 108, firstly, regarding the communication power in the selected wireless channel, the carrier detector 109 determines whether or not a frequency component having a communication power which exceeds a predetermined threshold value is included. The carrier signal detector 109 outputs the signal having the frequency component of which the communication power exceeding the threshold value is determined to be included, to the communication power measurement unit 110 and the decoder 113. The communication power measurement unit 110, under the control by the wireless control unit 105, measures the communication power of the signal output from the carrier detector 109 and transfers the information indicating the value to the measurement controller 104.

In addition, at the same time of measuring the communication power in each wireless channel, the received signal in each wireless channel is output to the BSSID determination unit 114 after being decoded to the MAC frame by the decoder 113. The BSSID determination unit 114 interprets the content of the input MAC frame and outputs information indicating from which access point the MAC frame is transmitted, to the measurement controller 104. More specifically, the BSSID determination unit 114 reads the address (BSSID) of the access point included in the header portion of the MAC frame transferred from the decoder 113, and outputs the BSSID to the measurement controller 104 as the information indicating the source of the MAC frame.

The information indicating the value of the communication power measured by the communication power measurement unit 110 and the BSSID of the access point where the communication power is radiated are input to the measurement controller 104 for each selection of the wireless channel by the channel selector 108. The measurement controller 104 acquires the information indicating the time (that is, the measurement time of the communication power) from the timer (not illustrated) for each reception of the information indicating the communication power and the BSSID, and outputs the information indicating the value of the communication power, BSSID, and the information indicating the measurement time to the measurement result recorder 111 in association with each wireless channel. The measurement result recorder 111, for example, is an EEPROM, and stores the information indicating the value of the communication power, the BSSID, and the information indicating the measurement time transferred from the measurement controller 104 in association with each other in each wireless channel.

The measurement controller 104, triggered by completing the measurement of the communication power for all the wireless channels, transfers the notification indicating that the measurement has been completed to the mail transmission controller 115. The mail transmission controller 115, triggered by receiving the above notification, instructs the mail transmission unit 116 to transmit the information related to the measurement result to the predetermined destination by mail. The destination for the transmission of the information related to the measurement result may be, for example, designated as the mail address of the operation administrator of the wireless LAN and the mail address is stored in the mail transmission address information holder 118 in advance.

The mail transmission unit 116, according to the instruction transferred from the mail transmission controller 115, reads the information related to the measurement result (that is, the information indicating the communication power of the wireless channel, BSSID and the measurement time) from the measurement result recorder 111, creates mail data in which the information items are written in the text and transmits the mail data to the predetermined destination using a protocol in accordance with the mail system such as electronic mail or short mail. The mail transmitted from the mail transmission unit 116 is transmitted via the communication network selected by the communication path selector 127 among the wireless LAN communication network and the mobile telephone network. More specifically, the communication path selector 127 selects any one of the communication path of the wireless LAN communication or the mobile telephone network in accordance with the state of participation in the BSS. That is, the communication path selector 127 selects wireless LAN when the wireless terminal device participates in the BSS of the wireless LAN and selects the mobile telephone network when the wireless terminal device does not participate in the BSS of the wireless LAN. In the present embodiment, since the wireless terminal device leaves the BSS during the measurement of the communication power from the access point of the wireless LAN, the mobile telephone network is selected as the communication path for the mail transmission.

In this way, in the present embodiment, the measurement result of the index (the communication power in the present embodiment) indicating the quality of the communication state is transmitted to the operation administrator of the wireless LAN by mail via the mobile telephone network other than the wireless LAN of which the communication state is subject to be measured. The operation administrator of the wireless LAN reads the text of the mail and specifies the measurement position by inquiring of the user using the wireless terminal device at which place the wireless terminal device is located when the measurement of the communication power for each wireless channel is performed, and it is possible to ascertain the communication state (the state of the communication power and the BSS) of the wireless channel in the specific position. That is, the information indicating the measurement time of the communication power in the present embodiment has a role of enabling the operation administrator to specify the measurement place. In addition, in the present embodiment, the notification of the measurement result to the operation administrator of the wireless LAN is performed via the wireless communication network other than the wireless LAN of which the communication state is subject to be measured. For this reason, even in a case where the communication state of the wireless LAN is not good such as a case where the communication power transmitted from the access point of the wireless LAN is not sufficient or a case where there is interference with the communication power transmitted from another access point, it is possible to notify the operation administrator of the measurement result on a real time basis. In a case where the communication cannot be performed via the mobile telephone network, the mail transmission processing in the mail transmission unit 116 becomes unsuccessful due to a timeout. In this case, the mail transmission unit 116 may be caused to execute the mail transmission processing again after a certain time interval has passed. Furthermore, in the present embodiment, since the measurement of the communication state and the transmission of the measurement result to the predetermined destination are performed triggered by the fact that the wireless terminal device is not moving, it is not necessary for the user of the wireless terminal device to perform any operation for the measurement and the transmission.

In the present embodiment, triggered by the fact that the wireless terminal device is determined not to be moving, the measurement of the communication power for all the wireless channels is performed. However, the measurement of the communication power and the transmission of the measurement result to the predetermined destination may be performed each time a certain time has passed during the time duration when the wireless terminal device is determined not to be moving. According to such an aspect, while the user remains at one place and performs his work, even though the event that the communication power of each wireless channel changes every moment occurs (that is, communication state of each wireless channel changes every moment), it is possible to accurately capture the event. The measuring of the above-described certain time may be performed by the timer 103, or may be performed by a second timer by providing the second timer separate from the timer 103, which measures the certain time.

In addition, in the present embodiment, the communication power of the communication radio wave transmitted from the access point is used as the index indicating the quality of the communication state. However, a CRC error rate of the frames (for example, a beacon frame) transmitted from the same access point may be used, or a frame retransmission rate of the frames transmitted to another wireless terminal device from the same access point may be used. Here, the reason why the frame retransmission rate of the frames transmitted to another wireless terminal device from the same access point is used as the frame retransmission rate is because the wireless terminal device in the present embodiment leaves the BSS in which the wireless LAN participates prior to the measurement of the index indicating the quality of the communication state, and the wireless terminal device does not perform the data communication with the access point after the starting of the measurement of the index, and thus, the retransmission of the frames to the wireless terminal device is not performed.

For example, in a case where the CRC error rate is used as the index indicating the quality of the communication state, the measurement controller 104 may be caused to execute the following processing. That is, as is similar to the case of using the communication power as the index, triggered by receiving the determination result signal having the signal value "1" from the movement determination unit 102, the measurement controller 104 executes the processing of instructing the wireless LAN authentication controller 128 to temporarily leave the BSS in which the wireless LAN participates and the processing of notifying the movement determination unit 102 of the starting of the measurement of the index indicating the quality of the communication state, and further, the processing of initializing (clearing to zero) the CRC error rate stored in the storage unit. This is for aggregating the CRC error rate occurring after the starting of the measurement of the communication state. Thereafter, the measurement controller 104 transfers the BSSID and the CRC error rate to the measurement result recorder 111 for each reception of the BSSID from the BSSID determination unit 114 with reference to the CRC error rate stored in the storage unit together with information indicating the measurement time. The processing thereafter is the same as the case of using the communication power as the index indicating the quality of the communication state.

In addition, in a case where the frame retransmission rate is used as the index indicating the quality of the communication state, the measurement controller 104 may be caused to execute the following processing. That is, as is similar to the case of using the communication power as the index, triggered by receiving the determination result signal having the signal value "1" from the movement determination unit 102, the measurement controller 104 executes the processing of instructing the wireless LAN authentication controller 128 to temporarily leave the BSS in which the wireless LAN participates, and the processing of notifying the movement determination unit 102 of the starting of the measurement of the index indicating the quality of the communication state, and further, the processing of initializing (clearing to zero) the frame retransmission rate stored in the storage unit. This is for aggregating the frame retransmission rate occurring after the starting of the measurement of the communication state. Thereafter, the measurement controller 104 transfers the BSSID, the MAC address of the transmission destination and the frame retransmission rate to the measurement result recorder 111 for each reception of the BSSID from the BSSID determination unit 114 with reference to the frame retransmission rate stored in the storage unit for each MAC address of the transmission destination together with information indicating the measurement time. The processing thereafter is the same as the case of using the communication power as the index indicating the quality of the communication state. Here, the reason why the MAC address of the transmission destination is included in the information transferred to the measurement result recorder 111 is to enable the operation administrator of the wireless LAN to specify the place where the frame retransmission occurs. More specifically, the operation administrator of the wireless LAN can specify the wireless terminal device and the user thereof based on the MAC address of the transmission destination transmitted together with the frame retransmission rate, and can specify the position of the wireless terminal device by inquiring of the user at which place the wireless terminal device is located at the measurement time based on the information indicating the measurement time transmitted together with the frame retransmission rate.

If the CRC error rate is used as the index indicating the quality of the communication state, it is possible to ascertain the presence or absence of interference due to a communication radio wave transmitted from another access point in the position of the measurement of the communication state. This is because, in many cases, the CRC error occurs in a case where the frame is destroyed caused by interference due to a communication radio wave transmitted from another access point or another wireless terminal device. In addition, if the frame retransmission rate is used as the index indicating the quality of the communication state, it is possible to ascertain the radio wave state at the position of the other wireless terminal device that performs the communication with the access point in the vicinity of the wireless terminal device in the present invention. That is, in a case where the communication power or the CRC error rate is used as the index indicating the quality of the communication state, the communication state at the measurement position can be ascertained, and in a case where the frame retransmission rate is used as the index, the communication state in the vicinity of the measurement position can be ascertained. That is, the communication power and the CRC error rate are indices that represent the quality of the communication state from different viewpoints from each other (a viewpoint on whether the radio wave reaches with sufficient strength or not and a viewpoint whether the interference from another access point is received or not) at the position (a point) where the frequency of the user of the wireless terminal device using the wireless LAN is estimated to be high, and the frame retransmission rate is the index that represents the quality of the communication state in the vicinity of the position where the frequency of the user of the wireless terminal device using the wireless LAN is estimated to be high. Therefore, by measuring any two or all of the three indices among the communication power, the CRC error rate, and the frame retransmission rate, it is possible to evaluate the communication state of the wireless LAN with high accuracy and in a multifaceted manner.

B: Second Embodiment

Figure 2:
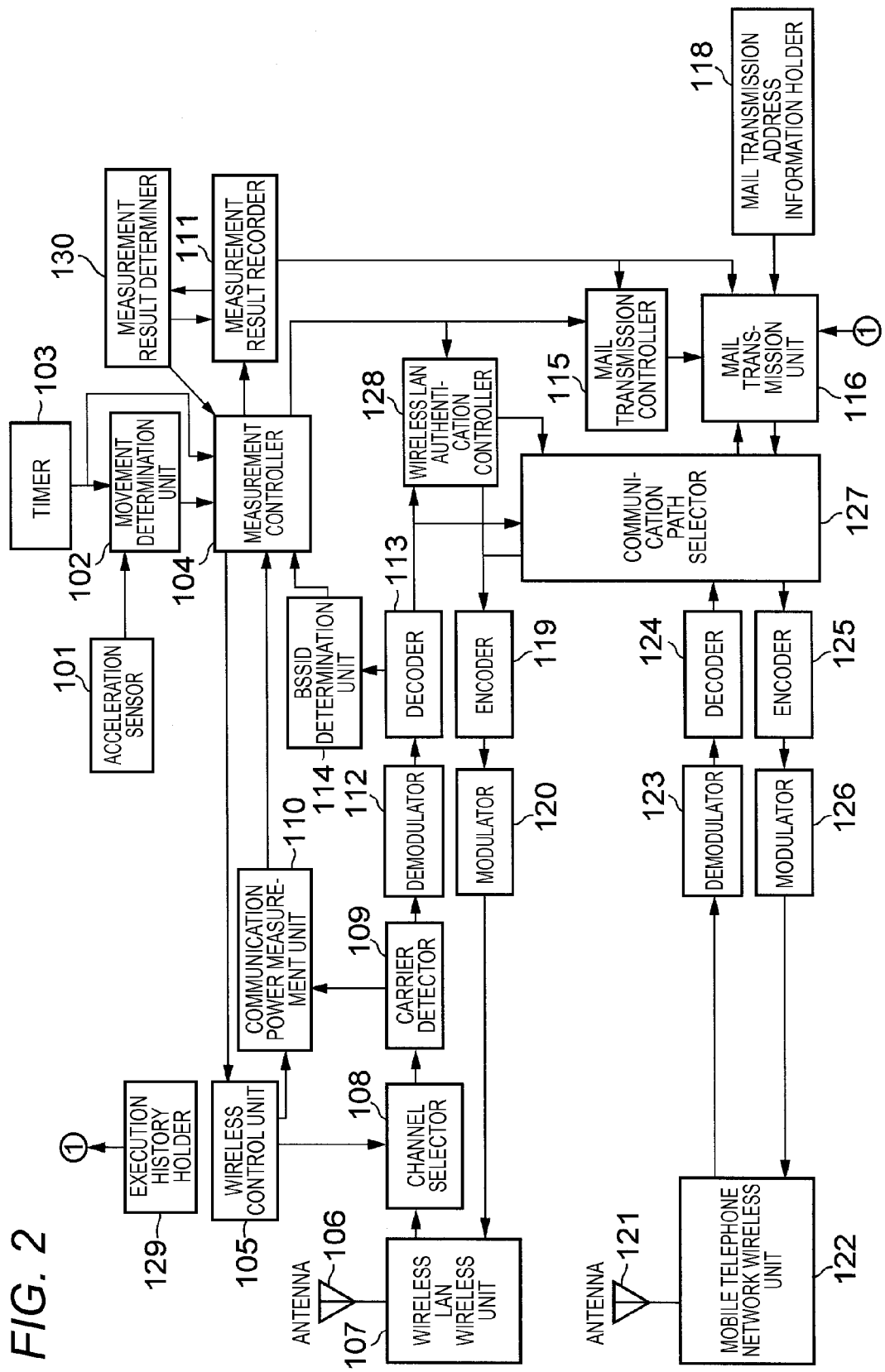
FIG. 2 is a block diagram illustrating a configuration of a wireless terminal device in a second embodiment of the present invention.

FIG. 2 is a block diagram illustrating a configuration of a wireless terminal device in a second embodiment of the present invention. As is similar to the wireless terminal device illustrated in above FIG. 1, the wireless terminal device illustrated in FIG. 2 is also a device that measures the communication power of a communication radio wave transmitted from an access point of a wireless LAN as an index indicating the quality of the communication state of the wireless LAN. In the present embodiment as well, it is needless to say that the CRC error rate or the frame retransmission rate may be used as the index indicating the quality of the communication state. In FIG. 2, the same components are referenced by the same reference signs as in FIG. 1. As is apparent from a comparison between FIG. 1 and FIG. 2, the wireless terminal device in the present embodiment is different from the wireless terminal device in the first embodiment in a point that measurement result determiner 130 is included.

The measurement result determiner 130 determines whether or not there is an abnormality in the measurement result of the index indicating the quality of the communication state with reference to the information stored in the measurement result recorder 111. As examples of the cases where there is an abnormality in the measurement result, a case where the index indicating the quality of the communication state cannot be measured (a case where the information indicating the communication power strength, the CRC error rate, or a frame retransmission rate is not recorded) or a case where the index of an abnormal value is measured (a case where the measured communication power is extremely low such as lower than the predetermined threshold value or a case where the measured CRC error rate or the frame retransmission rate is extremely high such as higher than the predetermined threshold value) can be considered. Then, in a case where there is an abnormality in the measurement result, the measurement result determiner 130 further classifies the type of abnormality (the communication power cannot be measured at all or the measured communication power is extremely low) and creates management information according to the type of such abnormality. The management information, for example, includes information that notifies the occurrence of the abnormality, information that prompts the administrator to change the radio wave state, and information indicating the priority in dealing with the problem. The measurement result determiner 130 adds the management information created as described above to the measurement result recorder 111 and transfers an instruction to the measurement controller 104 to transmit the management information to a predetermined destination. Hereinafter, similarly to the transmission of the measurement result, a mail regarding the management information is created and transmitted to the predetermined destination.

According to the present embodiment, in a case where an abnormality such as the measurement of the index indicating the quality of the communication state cannot be performed occurs, the management information for dealing with the abnormality is promptly transmitted to the predetermined destination (such as a terminal of the operation administrator of the wireless LAN). For this reason, according to the present embodiment, the operation administrator of the wireless LAN can promptly ascertain the occurrence of the abnormality in the wireless LAN under his/her own management, and can quickly cope with the abnormality with reference to the above management information. In addition, execution history or device information of the wireless terminal device related to the control of the communication via the wireless LAN may be included in the management information, and only in a case where there is an instruction from the operation administrator, may the execution history or the device information be transmitted to the administrator.

C: Third Embodiment

Figure 3:
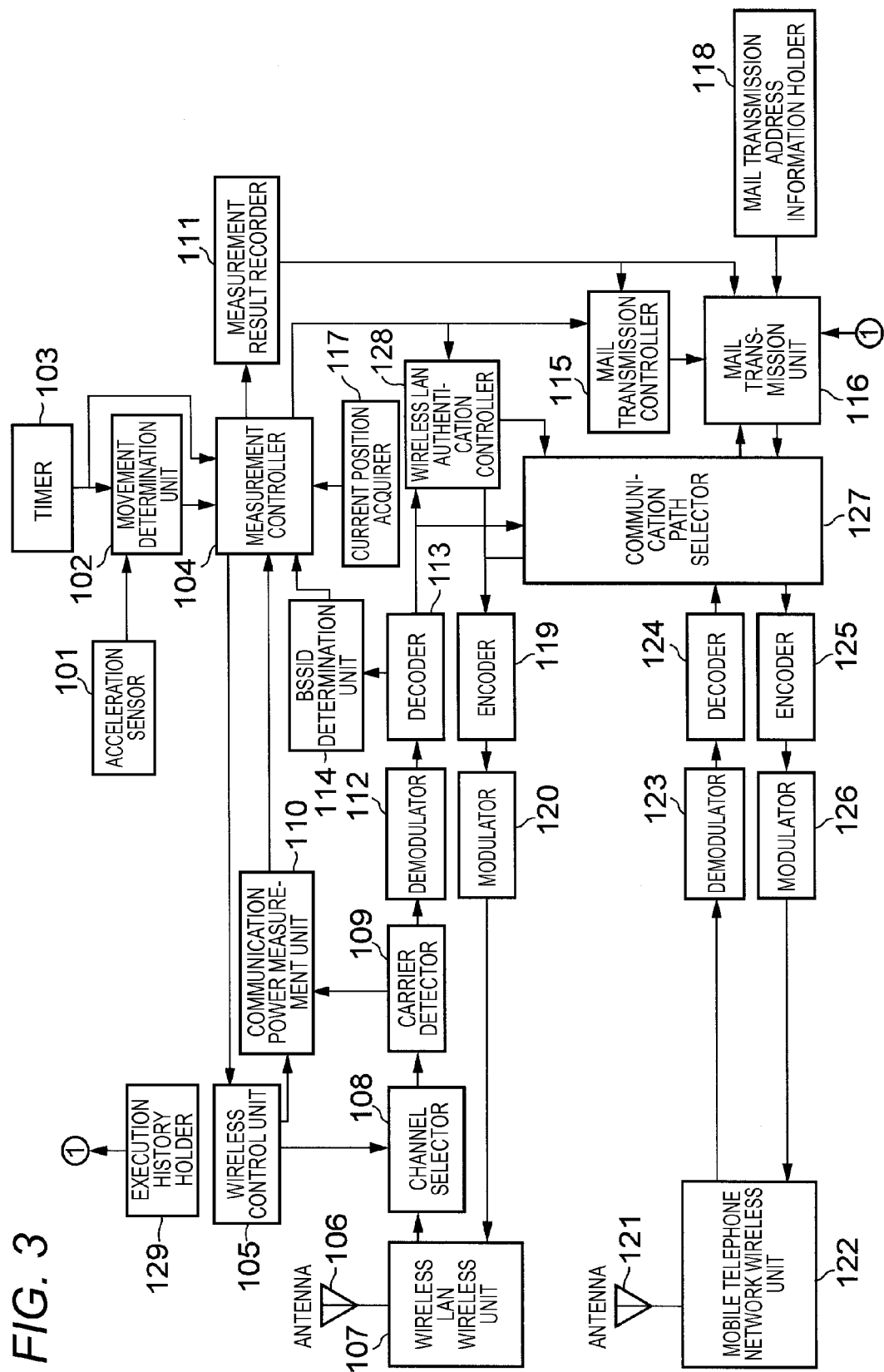
FIG. 3 is a block diagram illustrating a configuration of a wireless terminal device in a third embodiment of the present invention.

In the first embodiment described above, by inquiring of the user of the wireless LAN at which place the wireless terminal device is located at the measurement time using the information indicating the time when the measurement is performed as the information for allowing the operation administrator of the wireless LAN to specify the position of the measurement of the index indicating the quality of the communication state, the specifying of the measurement place can be realized. However, in such a specifying method, there is also a case in which it is difficult to accurately specify the place where the index is measured. Therefore, a configuration for obtaining information that indicates the measurement position of the index indicating the quality of the communication state may be added to the wireless terminal device. FIG. 3 is a block diagram illustrating an example of a configuration of a wireless terminal device in the third embodiment of the present invention. In FIG. 3 as well, the same components as in FIG. 1 are referenced by the same reference signs. As is apparent from a comparison between FIG. 3 and FIG. 1, the wireless terminal device in the present embodiment is different from the wireless terminal device in the first embodiment in a point that current position acquirer 117 that acquires information indicating the current position of the own device is included. Hereinafter, the case where the communication power of the communication radio wave transmitted from the access point of the wireless LAN is used as the index indicating the quality of the communication state is described. However, it is needless to say that, instead of the communication power (or together with the communication power), the CRC error rate or the frame retransmission rate (or both of the CRC error rate and the frame retransmission rate) may be used.

Figure 4:
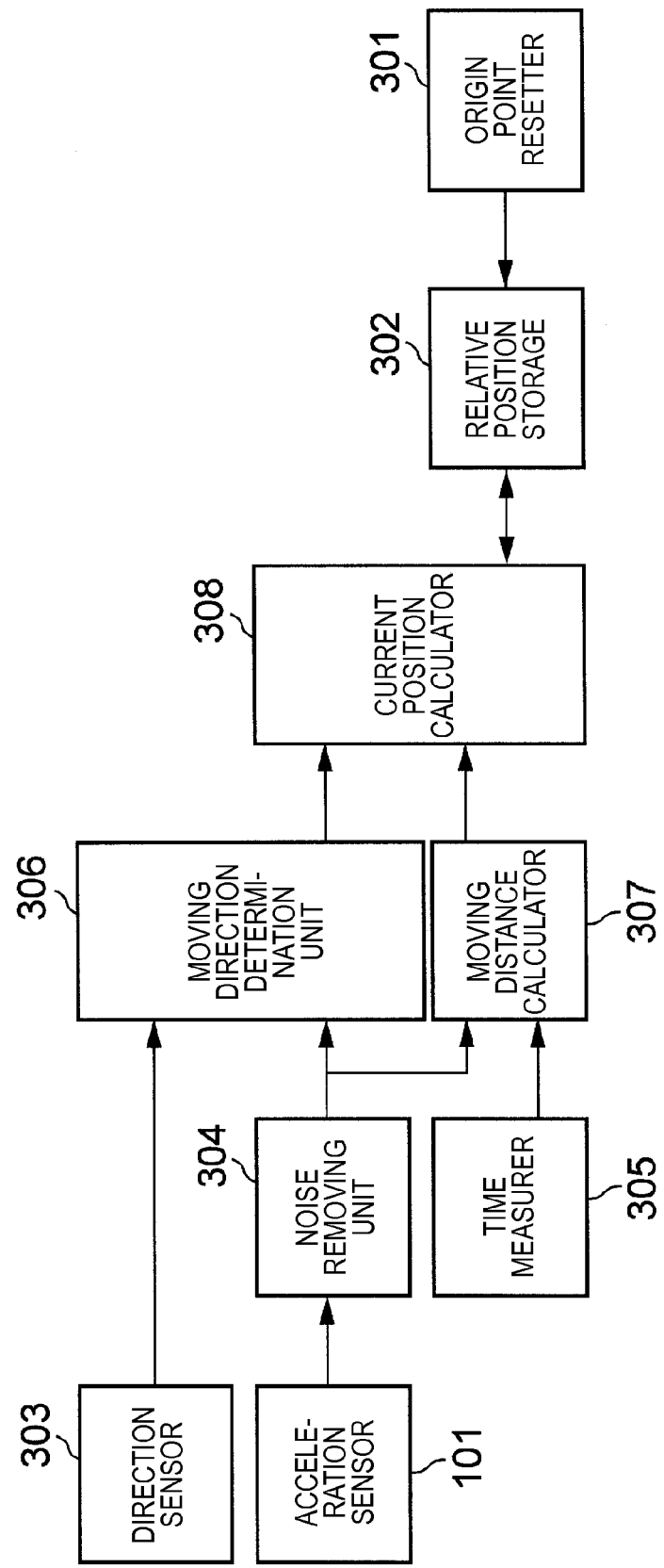
FIG. 4 is diagram illustrating a detailed configuration of current position acquirer in the wireless terminal device in the third embodiment.

FIG. 4 is diagram illustrating a detailed configuration of the current position acquirer 117. Relative position storage 302 holds coordinate information indicating a relative current position (that is, a current position of the user having the wireless terminal device) of the wireless terminal device with respect to a certain origin. The origin means a reference position when the communication power measured at each position is mapped on a physical map. This origin is designated by the operation administrator of the wireless LAN as any one place within the range of wireless use where the user uses the wireless LAN such as, for example, a corner or the center of an office of the user's workplace. Origin resetter 301 causes the user to perform the setting operation of the origin. As an example of the origin resetter 301, a software button that is implemented according to the application program which realizes the measurement of the communication power can be included. The user of the wireless terminal device in the present embodiment, when he/she goes to the workplace, firstly goes to the place corresponding to the origin designated by the administrator of the wireless LAN and performs the operation of setting the origin on the origin resetter 301. Then, the relative position storage 302 resets the previously stored coordinate information to the predetermined coordinate information indicating the origin (for example (0, 0)).

When the resetting of the origin is performed as described above, then, a noise removing unit 304 calculates the moving average value of the acceleration data output from the acceleration sensor 101 and outputs the value to a moving distance calculator 307 and a moving direction determination unit 306. This is because, by calculating the moving average value of the acceleration values as described above, it is possible to remove the influence of the acceleration caused by the user's fine movements. The moving distance calculator 307 start to measure the time by time measurer 305 triggered by the fact that the data representing the acceleration which does not come within the predetermined range of which the center is the magnitude of the gravitational acceleration is transferred from the noise removing unit 304, calculates the user's moving distance using the time measured until the data representing the acceleration which comes within the predetermined range is transferred from the noise removing unit 304 (that is, until the user of the wireless terminal device stops moving) and the information received from the noise removing unit 304 during the same duration, and then, outputs the moving distance to a current position calculator 308 and the moving direction determination unit 306.

A direction sensor 303 is, for example, a geomagnetic sensor, periodically detects the direction in which the wireless terminal device is facing, and sequentially outputs the information indicating the direction to the moving direction determination unit 306. The moving direction determination unit 306 determines the moving direction of the user viewed from the position indicated by the information stored in the relative position storage 302 using the direction indicated by the information periodically output from the direction sensor 303 and the moving average value of the acceleration transferred from the noise removing unit 304, and outputs the moving direction to the current position calculator 308.

The current position calculator 308 calculates the relative current position viewed from the position indicated by the information stored in the relative position storage 302 using the information indicating the moving distance input from the moving distance calculator 307 and the information indicating the moving direction input from the moving direction determination unit 306, and outputs the relative current position to the relative position storage 302. For example, in a case where a result of a site survey is indicating moving toward the north direction and the east direction viewed from the origin as the positive direction using the two-dimensional coordinate plane having one coordinate axis of the south-north direction and the other coordinate axis of the east-west direction, the current position calculator 308 may be caused to perform the processing of resolving the above moving distance into moving distance in the south-north direction and moving distance in the east-west direction and then, calculating the current position. The relative position storage 302, triggered by receiving the information indicating the new current position, updates the information stored up to that time to the new information. In this way, since the information indicating the current position (the relative position viewed from the origin designated in advance) of the user carrying the wireless terminal device is stored in the relative position storage 302, when specifying the measurement position of the index indicating the quality of the communication state, it is preferable to refer to the information stored in the relative position storage 302.

In the present embodiment, based on the magnitude of the acceleration detected by the acceleration sensor 101 and the direction of the wireless terminal device detected by the direction sensor 303, the current position of the user of the wireless terminal device is calculated by the calculation. However, there may be a configuration of specifying the current position using a global positioning system (GPS).

In addition, as in the present embodiment, in a case where the current position acquirer 117 is provided in the wireless terminal device, the region where the measurement of the communication state is performed is designated in advance and only in a case where the current position represented by the information acquired by the current position acquirer 117 is in the designated region, may the measurement controller 104 be caused to perform the measurement of the communication state. For example, the region corresponding to the workplace of the user may be designated in advance as the above-described region. In this way, only in a case where the user is in a specific region (for example, the workplace), is the measurement of the communication state performed, and in a case where the user is in a region other than the specific region (for example, user's home or the like), the measurement is not performed, and thus, it is possible to avoid unnecessary measurement of the communication state.

D: Fourth Embodiment

In each embodiment described above, the measurement control program for causing the measurement controller 104 to perform the measurement control of the index using the communication power of the communication radio wave transmitted from the access point of the wireless LAN as the index indicating the quality of the communication state of the wireless LAN is stored in the storage unit (not illustrated) of the wireless terminal device in advance. However, the wireless terminal device may be caused to perform the processing of acquiring the measurement control program by downloading from a server apparatus provided on the wireless LAN or the mobile telephone network and storing the measurement control program in the storage unit (or overwriting the measurement control program over the existing measurement control program). According to such an aspect, it is possible to easily perform the switching of the index to be measured, upgrading the version of the measurement control program, adding a new function of measuring the communication state in the present embodiment, and the like. In addition, a measurement program management function may be given to the wireless terminal device, in which the measurement control program or the program that performs the analysis of the measurement result (hereafter, both are collectively referred to as "measurement program") is downloaded and executed in response to the instruction given by the operation administrator of the wireless LAN. The fourth embodiment is characterized by the fact that the above-described measurement program management function is provided in the wireless terminal device. Hereinafter, the fourth embodiment of the invention will be described by an exemplary case where a new measurement program is downloaded from the above-described server apparatus provided in the mobile telephone network.

Figure 5:
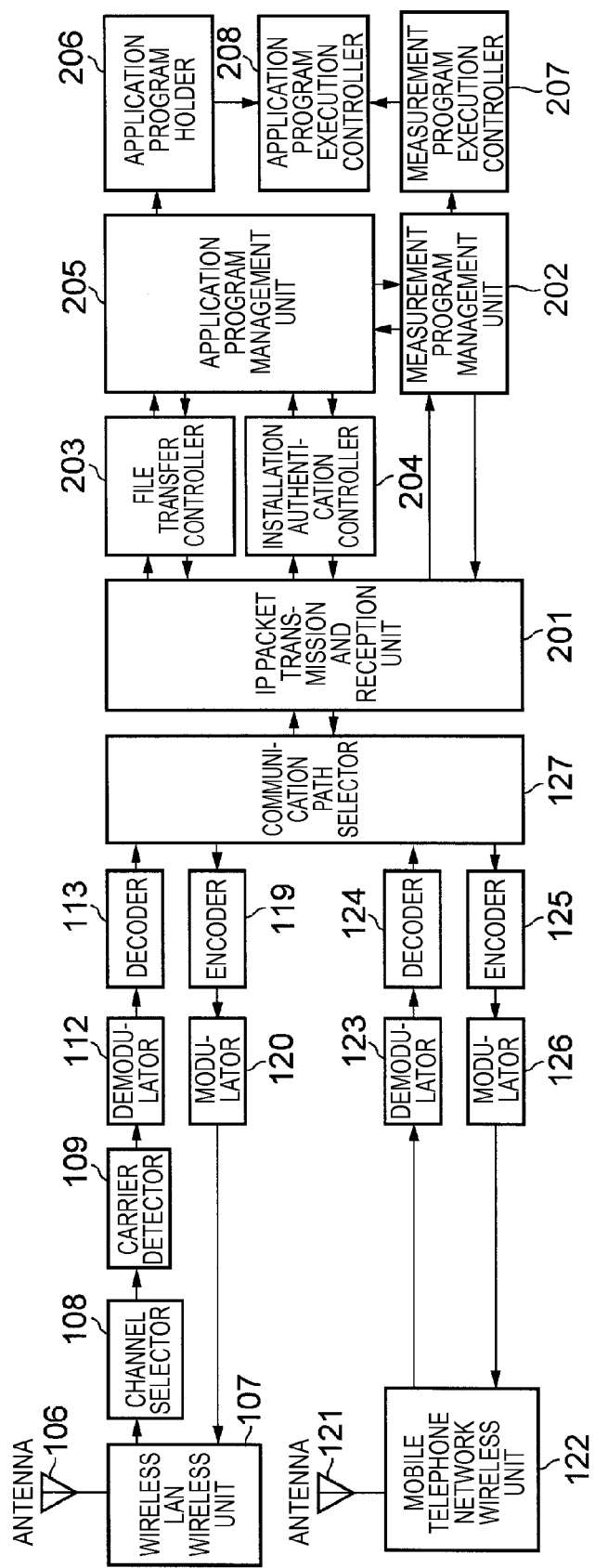
FIG. 5 is a diagram illustrating an example of a configuration of the wireless terminal having an application program management function in a fourth embodiment of the present invention.

FIG. 5 is a diagram illustrating an example of a configuration of the wireless terminal device in the present embodiment. An IP packet transmission and reception unit 201 transmits and receives IP packets to and from another device (for example, an administrator's terminal used by the operation administrator of the wireless LAN or the above-described server apparatus) connected to the mobile telephone network. When the IP packet that instructs the execution of downloading the new measurement program is received, the IP packet transmission and reception unit 201 transfers the IP packet to a measurement program management unit 202.

The measurement program management unit 202 is a functional unit that manages the storage and execution of the measurement program. The measurement program management unit 202, when the IP packet that instructs to execute the downloading of the new measurement program is received, instructs an application program management unit 205 to download the program from the above-described server apparatus, which is instructed to be downloaded by the IP packet.

The application program management unit 205 is a functional unit that performs the management of all the application programs stored in the wireless terminal device. When the measurement program management unit 202 instructs to download the new program, the application program management unit 205 instructs a file transfer controller 203 to download the program from the above-described server apparatus.

The file transfer controller 203 is a functional unit that performs the file transfer control such as FTP. The file transfer controller 203 executes the downloading of the program instructed by the application program management unit 205. At this time, an installation authentication controller 204 checks the electronic signature which authenticates that the server is authorized and the program is valid so as to avoid an invalid program being obtained from an unauthorized server apparatus. The program downloaded by the file transfer controller 203 is held in application program holder 206.

The application program management unit 205, when the program is successfully downloaded, notifies the measurement program management unit 202 that the download is completed. Immediately after the completion of the downloading or according to the instruction given from the application program management unit 205, the measurement program management unit 202 receiving the notification of the completion of the downloading instructs a measurement program execution controller 207 to execute the program, and the measurement program execution controller 207 instructs an application program execution controller 208 to execute the program. The application program execution controller 208 receiving the instruction stops the execution of other programs at that time point and executes the downloaded program or executes the program downloaded in parallel with other programs by multi-tasking.

For example, before the new measurement program is downloaded from the above-described server apparatus, the communication power as the index indicating the quality of the communication state of the wireless LAN is used, and at the time of measuring the communication power, it is assumed that the measurement program that causes the measurement controller 104 to perform the processing of determining whether the received wireless frame is the beacon from the BSS (refer to FIG. 6) or not and the processing of release from the participation state to the BSS (refer to FIG. 7) is stored in the wireless terminal device. In the wireless terminal device in which the measurement program is executed, the following processing is executed triggered by receiving the wireless frame. First, whether or not there is a CRC error in the received wireless frame is determined (STEP SA100 in FIG. 6), and in a case where the determination result is "Yes" (that is, determination that there is a CRC error), the frame is discarded (STEP SA110).

Conversely, in a case where the determination result in STEP SA100 is "No", whether or not the received frame is a control frame is determined (STEP SA120), and in a case where the determination result is "No" (that is, the received frame is the data frame), the processing related to the data frame is executed (STEP SA130). In a case where the determination result in STEP SA 120 is "Yes", whether or not the frame is a beacon from the BSS in which the wireless terminal device participates is determined based on the content of the received wireless frame (STEP SA140), and in a case where the determination result is "No", the determination of the participation state ends because the beacon is from another BSS. Conversely, in a case where the determination result in STEP SA140 is "Yes", the processing of resetting a connection protection counter to a predetermined value is executed (STEP SA160).

Figure 7:
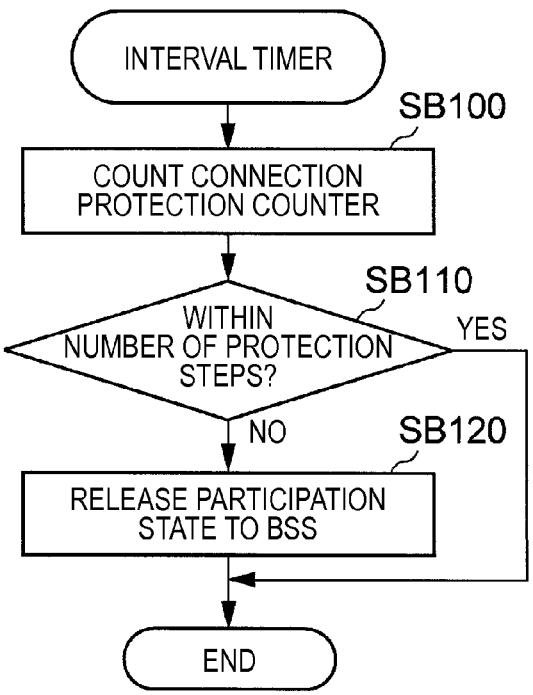
FIG. 7 is a flow chart illustrating a processing of determining the release from the participation state in the BSS in the wireless terminal device in the fourth embodiment.

The connection protection counter is, as illustrated in FIG. 7, a counter used for determining whether or not to maintain the participation state in the BSS. As illustrated in FIG. 7, the connection protection counter counts down according to the interval timer (STEP SB100), and in a case where the value of the connection protection counter is less than a certain value ("No" in STEP SB110 in FIG. 7), the participation state in the BSS is released (STEP SB120). Conversely, in a case where the value of the connection protection counter does not reach a certain value ("Yes" in STEP SB110 in FIG. 7), the participation state in the BSS is maintained. Before the value of the connection protection counter counted down to a certain value, if the beacon transmitted from the BSS in which the wireless LAN participates is normally received, the countdown of the connection protection counter is reset to a predetermined value and the participation state in the BSS is maintained.

Here, a case where a failure that the participation state in the BSS is erroneously released occurs is considered. The phenomenon in which the participation state in the BSS is erroneously released occurs in a case where the connection protection counter is counted down until the counted value becomes less than a certain value, and the reason thereof is considered to be the following (a), (b), and (c). (a) The communication power from the access point does not reach the wireless terminal device and the beacon transmitted from the BSS in which the wireless LAN participates is not detected. (b) The communication power reaches, but the CRC error occurs and the above-described beacon is not detected. As described above, this event can occur in a case where a collision occurs between the wireless frame from the BSS and wireless frame from another BSS due to interference from the other BSS. (c) The above-described beacon is normally detected, but an unpredicted failure occurs in the terminal control at the wireless terminal device side, and the connection protection counter is counted down until the counted value becomes less than the certain value.

Figure 6:
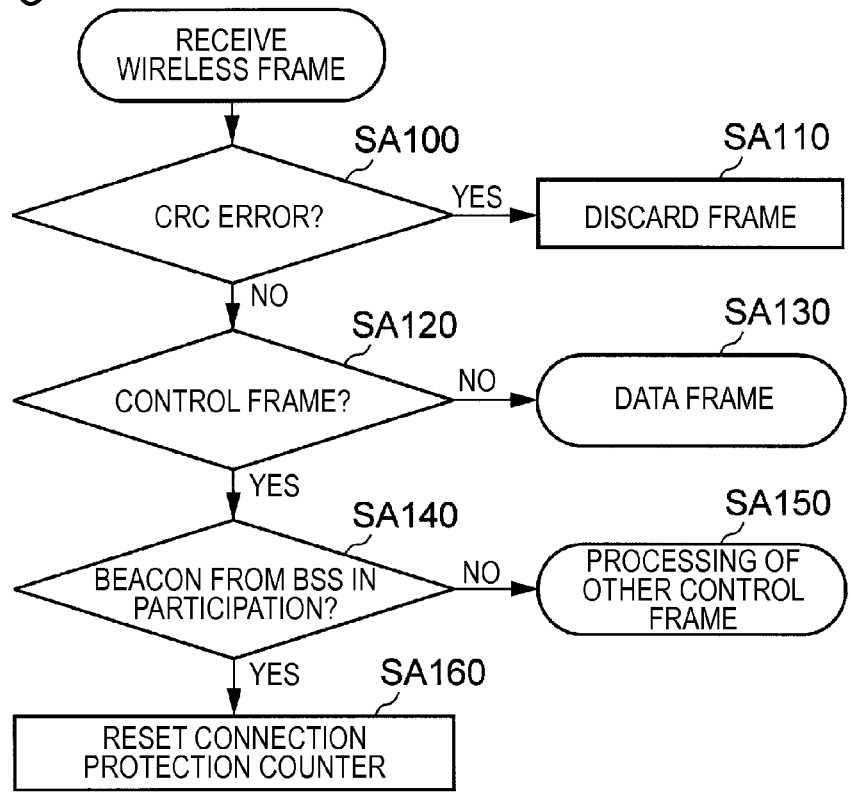
FIG. 6 is a flow chart illustrating a processing of determining whether a received wireless frame is a beacon from the BSS or not, in the wireless terminal device in the fourth embodiment.
Figure 8:
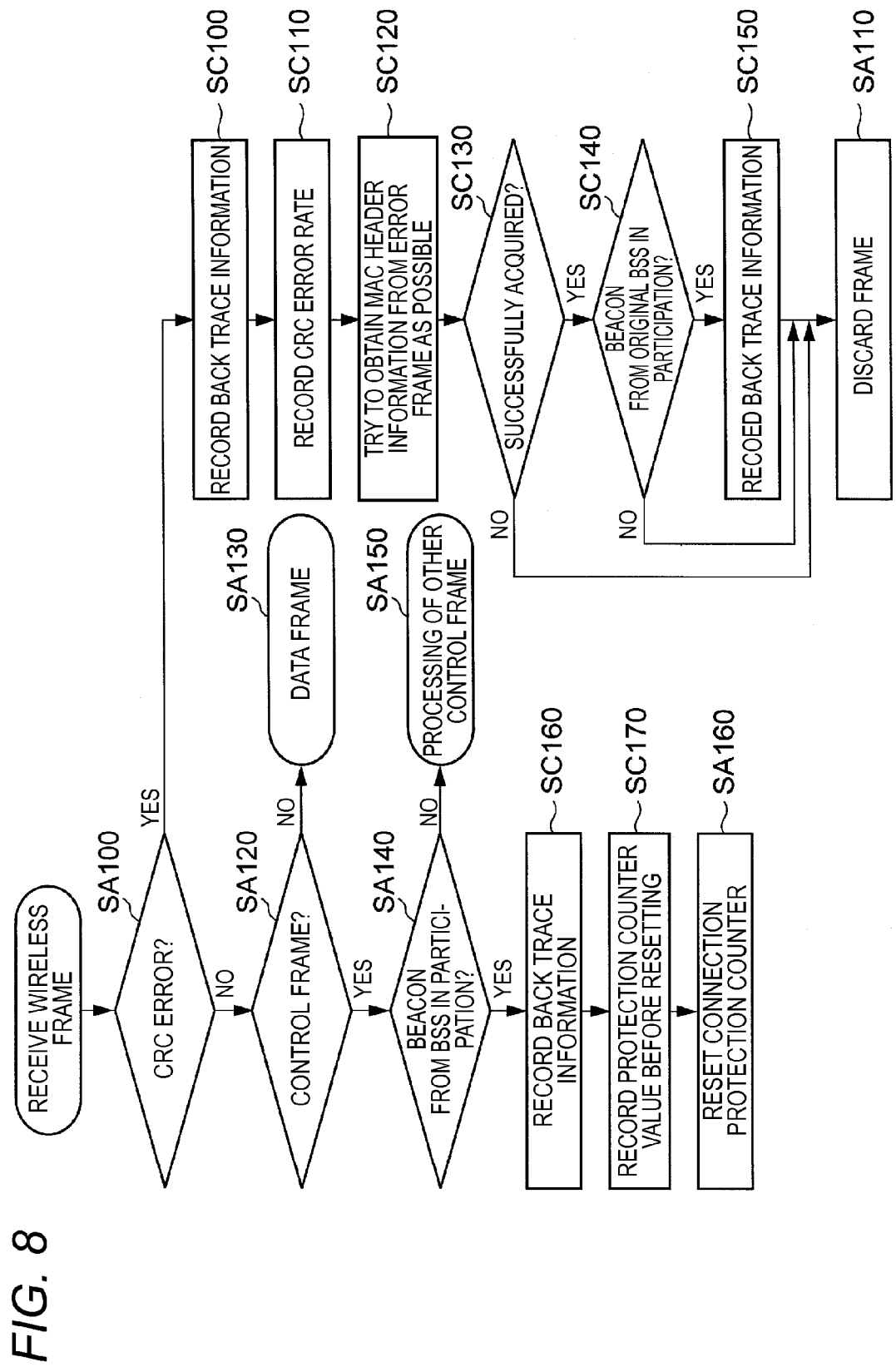
FIG. 8 is a flow chart illustrating a processing in which a failure isolation processing is added to the processing of determining whether a received wireless frame is a beacon from the BSS thereof or not, in the wireless terminal device in the fourth embodiment.

When the operation administrator of the wireless LAN reads the mail transmitted from the wireless terminal device using the administrator's terminal, and ascertains the occurrence of the above failure based on the management information included in the mail, in order to identify which of the above (a), (b), and (c) is the reason for the failure, the operation administrator causes the administrator's terminal to transmit the IP packet that instructs to download a new measurement program (a program causing the wireless terminal device to execute the processing illustrated in FIG. 8 instead of the processing illustrated in FIG. 6) to the wireless terminal device. In the wireless terminal device, triggered by receiving the IP packet, the update of the measurement program is executed.

As is apparent from the comparison between FIG. 8 and FIG. 6, the processing illustrated in FIG. 8 is different from the processing illustrated in FIG. 6 in the point that, in a case where the determination result is "Yes" in STEP SA100, the processing tasks of STEP SC100 to STEP SC150 are executed prior to the processing of STEP SA110, and in a case where the determination result is "Yes" in STEP SA140, the processing tasks of STEP SC160 and STEP SC170 are executed prior to the processing of STEP SA160. In STEP SC100 in FIG. 8, back trace information indicting the occurrence of the CRC error is recorded. In STEP SC110 executed next, the processing tasks of calculating the CRC error rate which is the proportion of the CRC errors with respect to the received frames and recording the CRC error rate as the back trace information are executed. That is, the program illustrated in FIG. 8 is a program for measuring the CRC error rate as the index indicating the quality of the communication state. In STEP SC120 executed next, the MAC header information is tried to be taken out from the frame which is determined to have the CRC error as far as possible. Then, in a case where the MAC header information cannot be obtained ("No" in STEP SC130 in FIG. 8), the above-described processing of STEP SA110 is executed, and in a case where the MAC header information can be obtained ("Yes" in STEP SC130), the beacon of the BSS in which the wireless LAN participates is tried to be taken out from the MAC header information. In a case where the beacon from the BSS cannot be taken out ("No in STEP SC140), the above-described processing of STEP SA110 is executed, and conversely, in a case where the beacon from the BSS can be taken out, the processing of discarding the frame is executed after the information indicating the beacon is recorded (STEP SC150) as the back trace information. In the processing illustrated in FIG. 8, in STEP SC160 executed subsequent to the case where the determination result in STEP SA140 is "Yes", the back trace information which indicates that the beacon of BSS in which the wireless LAN participates is obtained is recorded, and in STEP SC170 executed subsequent to the STEP SC160, the processing of recording the protection counter value (that is, the value indicating the elapsed time from the previous detection of the beacon) at that time point as the back trace information is executed, and then, the processing of STEP SA160 is executed.

If the result of the execution of the processing in FIG. 8 shows that the back trace information is not recorded at all, that means that the wireless terminal device does not receive the wireless frame at all. Therefore, it can be determined that the communication power from the access point does not reach the position where the measurement of the communication power is performed by the wireless terminal device. Therefore, by the presence or absence of the records of the back trace information, it is possible to identify whether the reason for the release from the participation state to the BSS is the above-described reason (a) or not.

On the other hand, in a case where the back trace information is recorded, it is possible to identify the reasons (b) and (c) with reference to the back trace information. For example, if the fact that the CRC error is detected and the CRC error rate are recorded, it can be determined that the reason for the release from the participation state to the BSS is the reason (b). Even in a case where the CRC error occurs, as long as the MAC header information of the frame is not destroyed, it is possible to determine whether or not the frame is from the BSS, and thus, the MAC header information can be auxiliary information for the determination of whether the reason for the release from the participation state to the BSS is the reason (b) or not. In addition, in a case where the back trace information which indicates that the beacon is detected is recorded, it can be determined that the reason for the release from the participation state to the BSS is the reason (c). In this case, furthermore, information which indicates how much time has elapsed since the previous detection of the beacon is also recorded, and thus, further, it can be used as auxiliary information for identifying the reason in detail.

According to the present embodiment, triggered by the occurrence of the failure such as release from the connection state to the BSS, the update of the measurement program is executed, and additional information (the index indicating the quality of the communication state in a different point of view from the communication power, the CRC error rate in the present embodiment) for tracing the reason for the release of the connection can automatically be collected, and thus, it is possible to quickly perform specifying or identifying of the reason for the abnormality or the failure. In addition, it is also possible to obtain detailed information by causing the wireless terminal device to download and execute a measurement program for performing a further detailed investigation based on the obtained additional information.

E: Fifth Embodiment

Figure 9:
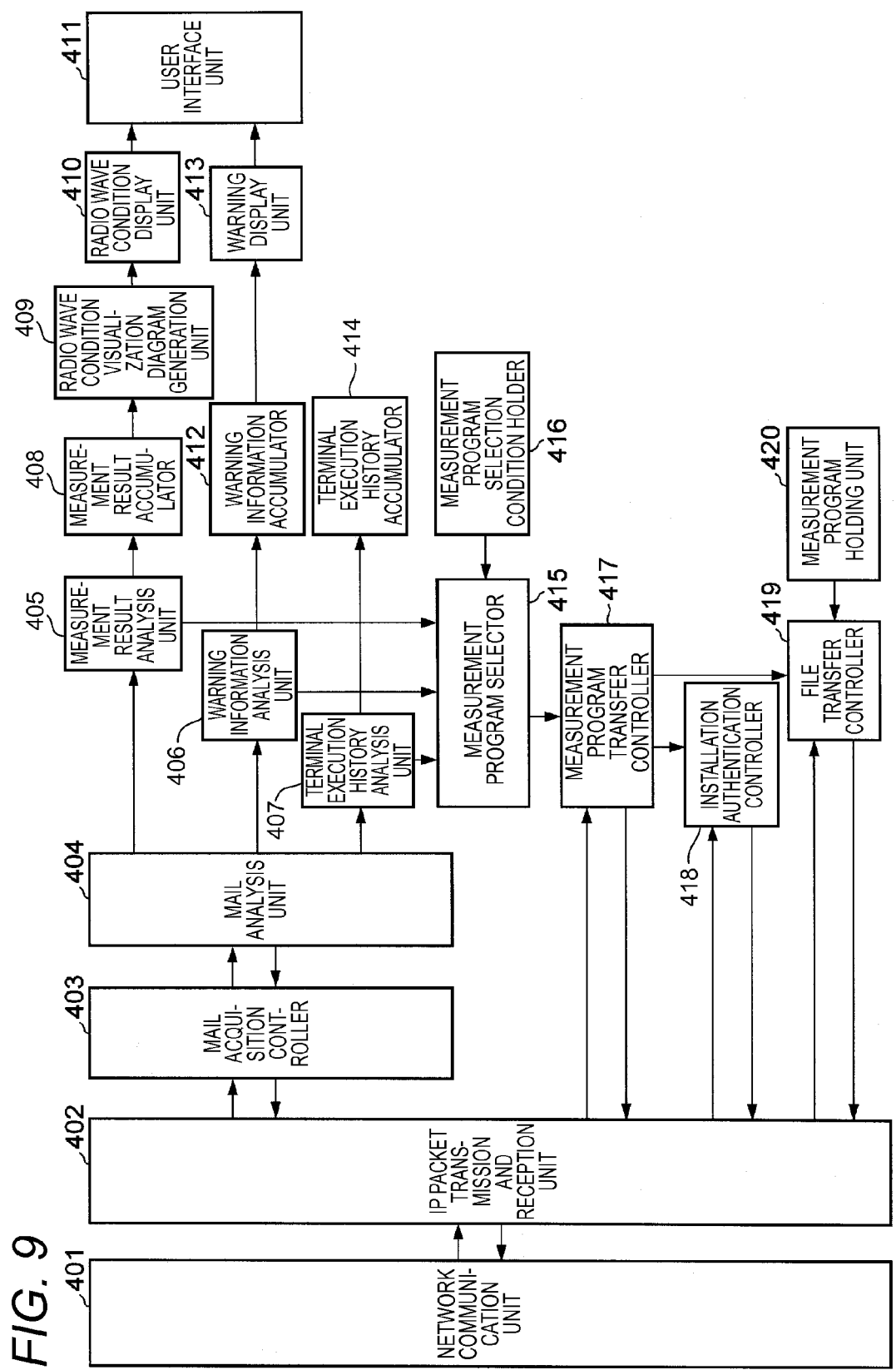
FIG. 9 is a block diagram illustrating a configuration of a server device in a fifth embodiment of the present invention.

In the embodiments described above, a case is described, in which the notifying destination of the measurement result of the index indicating the quality of the communication state is the administrator's terminal. However, of course, the server apparatus in the fourth embodiment may be the notifying destination of the above measurement result. According to such an aspect, based on the measurement result notified from the wireless terminal device, it is possible to cause the above server apparatus to determine whether the detailed analysis is necessary or not, and is possible to automatically download and execute the program for the detailed analysis. FIG. 9 is a block diagram illustrating a configuration of the server apparatus of the present embodiment. In FIG. 9, the mail sent from the wireless terminal device is accumulated in the external mail server, and the server apparatus in FIG. 9 is configured to acquire the mail from the external mail server.

An IP packet transmission and reception unit 402 performs a communication of the network layer between the IP packet transmission and reception unit 402 and the wireless terminal device or the mail server via a network communication unit 401. A mail acquisition controller 403 acquires the mail from the mail server via the IP packet transmission and reception unit 402 using the mail acquisition protocol such POP 3, and sends the mail to a mail analysis unit 404. The mail analysis unit 404 analyzes the header and the body of the mail, and categorizes the information described in the mail as information indicating a measurement result of the communication state, information indicating a warning, and information indicating the history of execution. Then, the mail analysis unit 404 outputs the information indicating the measurement result of the communication state to the measurement result analysis unit 405, the information indicating the warning to a warning information analysis unit 406, and the information indicating the history of execution to a terminal execution history analysis unit 407 respectively.

The measurement result analysis unit 405 categorizes the content of the information indicating the measurement result of the communication state for each measurement position and each measurement time, converts the information into a reusable file format, and records the information in measurement result accumulator 408. The information accumulated in the measurement result accumulator 408 is used by the administrator for checking the situation. A radio wave condition visualization diagram generation unit 409 reads the information accumulated in the measurement result accumulator 408, for example, superimposes the information on a map (a floor map of the company in a case of the wireless LAN installed in the user's workplace) of a service area of the wireless LAN, and creates a diagram representing the index indicating the quality of the communication state and the change thereof in the position and the time in which the user exists. The diagram created by the radio wave condition visualization diagram generation unit 409 is output to a radio wave condition display unit 410. The radio wave condition display unit 410 displays the above diagram to the administrator through a user interface unit 411 such as a graphical user interface operated by the administrator.

The warning information analysis unit 406 analyzes the content of the information indicating the warning, converts the information into a reusable file format, and records the information in warning information accumulator 412. A warning display unit 413 reads the information accumulated in the warning information accumulator 412, and displays the information indicating the warning to the administrator through the user interface unit 411.

The terminal execution history analysis unit 407 analyzes the content of the information indicating the execution history of the wireless terminal device, converts the information into the reusable file format, and records the information in terminal execution history accumulator 414. The information indicating the execution history recorded in the terminal execution history accumulator 414 is read and reference is made thereto by the administrator according to necessity.

Into a measurement program selector 415, information indicating the analysis result of each of the measurement result analysis unit 405, the warning information analysis unit 406, and the terminal execution history analysis unit 407 are input. The measurement program selector 415 detects a distinctive situation change or an occurrence of an abnormality such a case as, for example, in which the beacon that can be received so far cannot suddenly be received any more by analyzing the information indicating each of the above analysis results. The measurement program selector 415 compares the detected situation change or the abnormality and the condition held in a measurement program selection condition holder 416, and selects the measurement program corresponding to the applicable condition. The measurement program selector 415 instructs a measurement program transfer controller 417 to transmit the IP packet instructing the download of the selected measurement program to the wireless terminal device. Rather than instructing the wireless terminal device to download the measurement program, the measurement program may be directly transmitted to the wireless terminal device, and may be instructed to be stored and executed.

A file transfer controller 419 reads the measurement program transmitted to the wireless terminal device from a measurement program holder 420 according to the download request received from the wireless terminal device or the instruction from the measurement program transfer controller 417, and transmits the measurement program to the wireless terminal device via the IP packet transmission and reception unit 402 and the network communication unit 401. An installation authentication controller 418 responds to the authentication request from the wireless terminal device, and performs the exchange of necessary information about the authentication.

According to the present embodiment, in a case where a distinctive situation change or an abnormality appears in the communication state of the wireless LAN based on various information items acquired from the wireless terminal device, the measurement control program to cope with the change or the abnormality is automatically transmitted to the wireless terminal device, and thus, it is possible to quickly cope with the change and the abnormality.

F: Modifications

As described above, the embodiments of the present invention are described. However, the below-described modifications may be added to the embodiments.

(1) The wireless terminal device in each of the above embodiment is configured to be able to use both of the wireless LAN (a first wireless communication network) and the mobile telephone network (a second wireless communication network). Here, the second wireless communication network is not limited to the mobile telephone network, and may be a wireless LAN conforming to a standard different from that of the wireless LAN or the Internet network connected to such a wireless LAN. In a case where the second wireless communication network is the Internet network, a free mail service may be used for transmission and reception of the mail for transmitting the measurement result of the communication state in the first wireless communication network to the predetermined destination.

(2) In each embodiment described above, the present invention is applied to the wireless terminal device having a wireless communicator that bears the function of performing transmission and reception of data via the first wireless communication network (the wireless LAN in each embodiment described above), the function of measuring the communication power in the first wireless communication network, and the function of performing the transmission and reception of the data via the second wireless communication network different from the first wireless communication network. However, the function of performing the transmission and reception of the data via the second wireless communication network different from the first wireless communication network of which the communication power is subject to be measured is not necessarily required. In other words, the antenna 121, the mobile telephone network wireless unit 122, the demodulator 123, the decoder 124, the encoder 125, and the modulator 126 in each embodiment described above are not essential components to the wireless terminal device in the present embodiment, and can be omitted. In a case where the wireless terminal device in each embodiment described does not have the function of performing the data communication via the mobile telephone network, triggered by returning to the BSS after the completion of the measurement of the communication power in the wireless LAN, the information indicating the measurement result may be transmitted to the predetermined destination via the wireless LAN. That is, if the wireless terminal device includes wireless communicator that performs the measurement of the index indicating the quality of the communication state in the wireless communication network and the transmission and reception of the data via the wireless communication network, by applying the present invention, and by providing the determiner for determining whether an own device is moving or not, and a measurement controller for controlling the wireless communicator so as to measure the index indicating the quality of the communication state of the wireless communication network, and for controlling wireless communicator so as to transmit information obtained by specifying the measurement position or information indicating the measurement position and the measured index to a predetermined destination, triggered by the fact that the determiner determines that the wireless terminal device is not moving.

(3) In each embodiment described above, the case of using a smart phone as the wireless terminal device is described. That is because it is particularly suitable for the implementation of the present invention since the mobile terminal such as a smart phone typically includes an acceleration sensor, and a direction sensor in addition to the wireless communicator that performs the measurement of the index indicating the quality of the communication state in the wireless communication network and the transmission and reception of the data via the wireless communication network. However, the application of the present invention is not limited to the smart phone, and the present invention can be applied to a common mobile terminal device such as a common mobile phone or a tablet terminal having a function of executing the program. In short, the present invention may be applied to an electronic apparatus that includes a configuration (an acceleration sensor or a direction sensor) for realizing the determiner and a configuration (for example, a program executer) for realizing the measurement controller in addition to the wireless communicator.

REFERENCE SIGNS LIST

101: acceleration sensor
102: movement determination unit
103: timer
104: measurement controller
105: wireless control unit
106, 121: antenna
107: wireless LAN wireless unit
108: channel selector
109: carrier detector
110: communication power measurement unit
111: measurement result recorder
112, 123: demodulator
113, 124: decoder
114: BSSID determination unit
115: mail transmission controller
116: mail transmission unit
117: current position acquirer
118: mail transmission address information holder
119, 125: encoder
120, 126: modulator
122: mobile telephone network wireless unit
127: communication path selector
128: wireless LAN authentication controller
129: execution history holder
130: measurement result determiner
201, 402: IP packet transmission and reception unit
202: measurement program management unit
203, 419: file transfer controller
204, 418: installation authentication controller
205: application program management unit
206: application program holder
207: measurement program execution controller
208: application program execution controller
301: origin point resetter
302: relative position storage
303: direction sensor
304: noise removing unit
305: time measurer
306: moving direction determination unit
307: moving distance calculator
308: current position calculator
401: network communication unit
403: mail acquisition controller
404: mail analysis unit
405: measurement result analysis unit
406: warning information analysis unit
407: terminal execution history analysis unit
408: measurement result accumulator
409: radio wave condition visualization diagram generation unit
410: radio wave condition display unit
411: user interface unit
412: warning information accumulator
413: warning display unit
414: terminal execution history accumulator
415: measurement program selector
416: measurement program selection condition holder
417: measurement program transfer controller
420: measurement program holder

The invention claimed is:

1. A wireless terminal device comprising:
an antenna for a first wireless communication network and a second wireless communication network that is different from the first wireless communication network;
a sensor;
a processor; and
a memory storing instructions, the processor executing the stored instructions to:
determine whether the wireless terminal device is moving or not in cooperation with the sensor;
start measuring an index indicating a quality of a communication state of the first wireless communication network in cooperation with the antenna, triggered by a fact that it is determined the wireless terminal device is not moving; and then
transmit the measured index and one of information capable of specifying a measurement position or information indicating the measurement position to a predetermined destination via the second wireless communication network in cooperation with the antenna.

2. The wireless terminal device according to claim 1, further comprising a timer,
wherein the processor further executes the stored instructions to cause the timer to start measuring time, triggered by the fact that it is determined that the wireless terminal device is not moving, and to control the antenna to perform the measurement of the index at certain time intervals while it is determined that the wireless terminal device is not moving.

3. The wireless terminal device according to claim 1, wherein the processor further executes the stored instructions to:
specify a position of the wireless terminal device,
wherein the processor further executes the stored instructions to control the antenna to perform the measurement of the index in a condition where the specified position is included within a region designated in advance.

4. The wireless terminal device according to claim 1, wherein the processor further executes the stored instructions to:

determine an abnormality of the measurement result,
wherein the processor further executes the stored instructions to create management information according to a type of the abnormality and control the antenna to transmit the management information to the predetermined destination in a case where the measurement result is determined to be abnormal.

5. The wireless terminal device according to claim 1, wherein the destination is a server apparatus, and wherein a program is executed in response to the measured index and one of information capable of specifying the measurement position or information indicating the measurement position, the program being for isolating a failure, which is sent back from the server apparatus in response to the transmission of the measurement result.

6. The wireless terminal device according to claim 1, further comprising:
an acceleration sensor that detects an acceleration generated according to external force applied to the wireless terminal device,
wherein the processor further executes the stored instructions to determine that the wireless terminal device is not moving in a case where time in which the magnitude of the acceleration comes within a predetermined range of which the center is the magnitude of the gravitational acceleration continues over the predetermined time period.

7. A measurement control method in a wireless terminal device, the measurement control method comprising:
determining whether the wireless terminal device is moving or not; and
starting measuring an index indicating a quality of a communication state of a first wireless communication network, triggered by a fact that it is determined that the wireless terminal device is not moving; and then
transmitting the measured index and one of information capable of specifying a measurement position or information indicating the measurement position to a predetermined destination via a second wireless communication network that is different from the first wireless communication network.

8. A method of controlling a processor of a wireless terminal device including an antenna, a sensor and a memory storing instructions, wherein the processor is controlled to execute the instructions to:
determine whether the wireless terminal device is moving or not in cooperation with the sensor;
start measuring an index indicating a quality of a communication state of a first wireless communication network, triggered by a fact that it is determined that the wireless terminal device is not moving; and then
transmit the measured index and one of information capable of specifying a measurement position or information indicating the measurement position to a predetermined destination via a second wireless communication network that is different from the first wireless communication network.

9. A non-transitory recording medium for storing a measurement control program causing a processor of a wireless terminal device to:
perform a measurement of an index indicating a quality of a communication state and transmission and reception of data;
determine whether the wireless terminal device is moving or not; and
control the wireless communicator to measure the index indicating the quality of the communication state of a first wireless communication network, triggered by the determination that the wireless terminal device is not moving, and then to transmit the measured index and one of information capable of specifying a measurement position or information indicating the measurement position to a predetermined destination via a second wireless communication network that is different from the first wireless communication network.

10. The measurement control method according to claim 7, further comprising,
starting measuring time, triggered by the fact that it is determined that the wireless terminal device is not moving,
wherein the measurement of the index is performed at certain time intervals while it is determined that the wireless terminal device is not moving.

11. The measurement control method according to claim 7, further comprising:
specifying a position of the wireless terminal device,
wherein the measurement of the index is performed in a condition where the specified position is included within a region designated in advance.

12. The measurement control method according to claim 7, further comprising:
determining an abnormality of the measurement result;
creating management information according to a type of the abnormality; and
transmitting the management information to the predetermined destination in a case where the measurement result is determined to be abnormal.

13. The measurement control method according to claim 7, wherein the destination is a server apparatus, and wherein a program is executed in response to the measured index and one of information capable of specifying the measurement position or information indicating the measurement position, the program being for isolating a failure, which is sent back from the server apparatus in response to the transmission of the measurement result.

14. The measurement control method according to claim 7, further comprising:
detecting an acceleration generated according to external force applied to the wireless terminal device,
wherein it is determined that the wireless terminal device is not moving in a case where time in which the magnitude of the acceleration comes within a predetermined range of which the center is the magnitude of the gravitational acceleration continues over the predetermined time period.

15. The wireless terminal device according to claim 1, wherein the first wireless communication network as a target for measurement of the index is a wireless LAN, and the second communication network for data transmission/reception is a mobile communication network.

16. The wireless terminal device according to claim 15, wherein the index indicating the quality of the communication state includes at least one of a magnitude of a communication power of a communication radio wave transmitted from an access point in the wireless LAN, a CRC error rate for frames transmitted from the access point and a frame retransmission rate for the frames transmitted from the access point.

17. A wireless terminal device comprising:
an antenna;
a sensor;
a processor; and
a memory storing instructions, the processor executing the stored instructions to:

select a communication path from one of a first wireless communication network and a second wireless communication network in accordance with a state of participation in a basic service set (BSS) of the first wireless communication network;

determine whether the wireless terminal device is moving or not in cooperation with the sensor;

start measuring an index indicating a quality of a communication state of the first wireless communication network in cooperation with the antenna, triggered by a fact that it is determined the wireless terminal device is not moving; and transmit the measured index and one of information capable of specifying a measurement position or information indicating the measurement position to a predetermined destination via the selected communication path in cooperation with the antenna.

18. The wireless terminal device according to claim 17, wherein the first wireless communication network is a wireless LAN and the second wireless communication network is a mobile telephone network, and the wireless LAN is selected as the communication path when the wireless terminal device participates in the BSS of the wireless LAN, whereas the mobile telephone network is selected as the communication path when the wireless terminal device does not participate in the BSS of the wireless LAN.

19. The wireless terminal device according to claim 17, wherein the first wireless communication network is a wireless LAN, and the processor further executes the stored instructions to inquire of a wireless LAN authentication controller whether or not the wireless terminal device participates in the BSS of the wireless LAN, and in a case where the wireless terminal device participates in the BSS, instruct the wireless LAN authentication controller to temporarily leave the BSS.

20. The wireless terminal device according to claim 17, wherein the destination is a server apparatus, and wherein a program is executed in response to the measured index and one of information capable of specifying the measurement position or information indicating the measurement position, the program being for isolating a failure, which is sent back from the server apparatus.

21. The wireless terminal device according to claim 4, wherein the management information includes at least one of information that notifies an occurrence of the abnormality, information that prompts an administrator to change a radio wave state, and information indicating a priority in dealing with a problem.

22. The wireless terminal device according to claim 4, wherein the destination is a server apparatus, and wherein a program is executed in response to the management information, the program being for isolating a failure, which is sent back from the server apparatus.

23. The wireless terminal device according to claim 1, wherein the position capable of specifying the measurement position is information indicating a relative position with respect to a predetermined original point.

24. The wireless terminal device according to claim 1, wherein the wireless terminal is a smartphone.

25. The wireless terminal device according to claim 1, wherein the antenna includes a first antenna used for the first wireless communication network and a second antenna used for the second wireless communication network.

26. The measurement control method according to claim 7, wherein the position capable of specifying the measurement position is information indicating a relative position with respect to a predetermined original point.

27. A wireless terminal device comprising:

an antenna;

a sensor;

a processor; and a memory storing instructions, the processor executing the stored instructions to:

select a communication path from one of a first wireless communication network and a second wireless communication network in accordance with a state of participation in a basic service set (BSS) of the first wireless communication network;

determine whether the wireless terminal device is moving or not in cooperation with the sensor;

start measuring an index indicating a quality of a communication state of the first wireless communication network in cooperation with the antenna, triggered by a fact that it is determined the wireless terminal device is not moving; and transmit the measured index and one of information capable of specifying a measurement position or information indicating the measurement position to a predetermined destination via the selected communication path in cooperation with the antenna, wherein the first wireless communication network is a wireless LAN and the second wireless communication network is a mobile telephone network, and wherein the wireless LAN is selected as the communication path when the wireless terminal device participates in the BSS of the wireless LAN, whereas the mobile telephone network is selected as the communication path when the wireless terminal device does not participate in the BSS of the wireless LAN, wherein the processor further executes the stored instructions to inquire of a wireless LAN authentication controller whether or not the wireless terminal device participates in the BSS of the wireless LAN, and in a case where the wireless terminal device participates in the BSS, instruct the wireless LAN authentication controller to temporarily leave the BSS, and wherein the wireless terminal device temporarily leaves the BSS during the measuring of the index and the transmitting of the measured index.

* * * * *